US 6,591,594 B2

(12) United States Patent
Hancock et al.

(10) Patent No.: US 6,591,594 B2
(45) Date of Patent: Jul. 15, 2003

(54) METHOD AND APPARATUS FOR RESTRICTING GRASS CUTTING OF A LAWN MOWER IN REVERSE

(75) Inventors: Frank H. Hancock, Jackson, GA (US); Steven D. Smyly, Griffin, GA (US); Lucius Levon Cole, College Park, GA (US); Fielder Fields Glass, McDonough, GA (US); James R. Powers, Conyers, GA (US); Stephen C. Price, Barnesville, GA (US)

(73) Assignee: Snapper, Inc., McDonough, GA (US)

( * ) Notice: Subject to any disclaimer, the term of this patent is extended or adjusted under 35 U.S.C. 154(b) by 0 days.

(21) Appl. No.: 10/092,938

(22) Filed: Mar. 6, 2002

(65) Prior Publication Data
US 2002/0162311 A1 Nov. 7, 2002

Related U.S. Application Data

(63) Continuation of application No. 09/586,368, filed on Jun. 2, 2000, now Pat. No. 6,405,513.
(60) Provisional application No. 60/137,577, filed on Jun. 4, 1999, provisional application No. 60/147,370, filed on Aug. 5, 1999, and provisional application No. 60/152,767, filed on Sep. 3, 1999.

(51) Int. Cl.[7] ................................................ A01D 69/00
(52) U.S. Cl. ....................................................... 56/10.8
(58) Field of Search ................................. 56/10.5, 10.8, 56/10.2 R, 10, 11.2, 11.3, 13.5, 16.7, 14.7; 180/6.48, 6.5, 733; 318/282

(56) References Cited

U.S. PATENT DOCUMENTS

| 3,984,967 A | 10/1976 | Jones |
| 3,999,643 A | 12/1976 | Jones |
| 5,314,038 A | 5/1994 | Peterson, Jr. |
| 5,994,857 A | 11/1999 | Peterson, Jr. et al. |
| 6,026,634 A | 2/2000 | Peter et al. |
| 6,026,645 A | 2/2000 | Stokes et al. |
| 6,109,010 A | 8/2000 | Heal et al. |

Primary Examiner—Robert E. Pezzuto
(74) Attorney, Agent, or Firm—Alston & Bird LLP

(57) ABSTRACT

A lock out feature for preventing a lawn mower from going into reverse unless the lawn mower blade is first disengaged, while allowing the lawn mower cutting blade to be reengaged upon being placed in reverse, the latch nevertheless allowing the lawn mower to be moved out of reverse without disengaging the lawn mower blade. An override feature is also allowed by use of a separate override control to allow the user to override the reverse lock out latch in order to go from forward or neutral into reverse without disengaging the cutting blade.

34 Claims, 17 Drawing Sheets

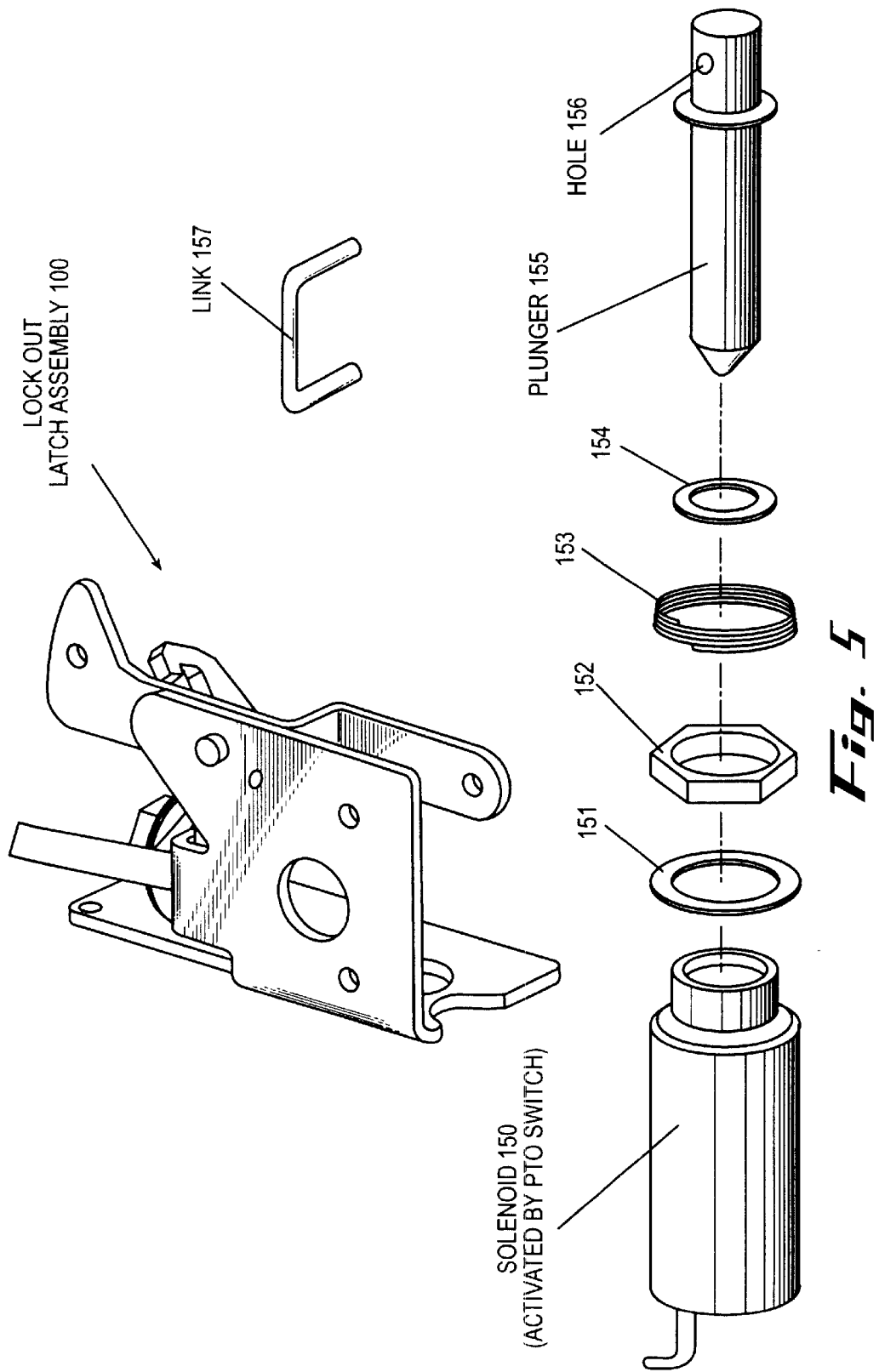

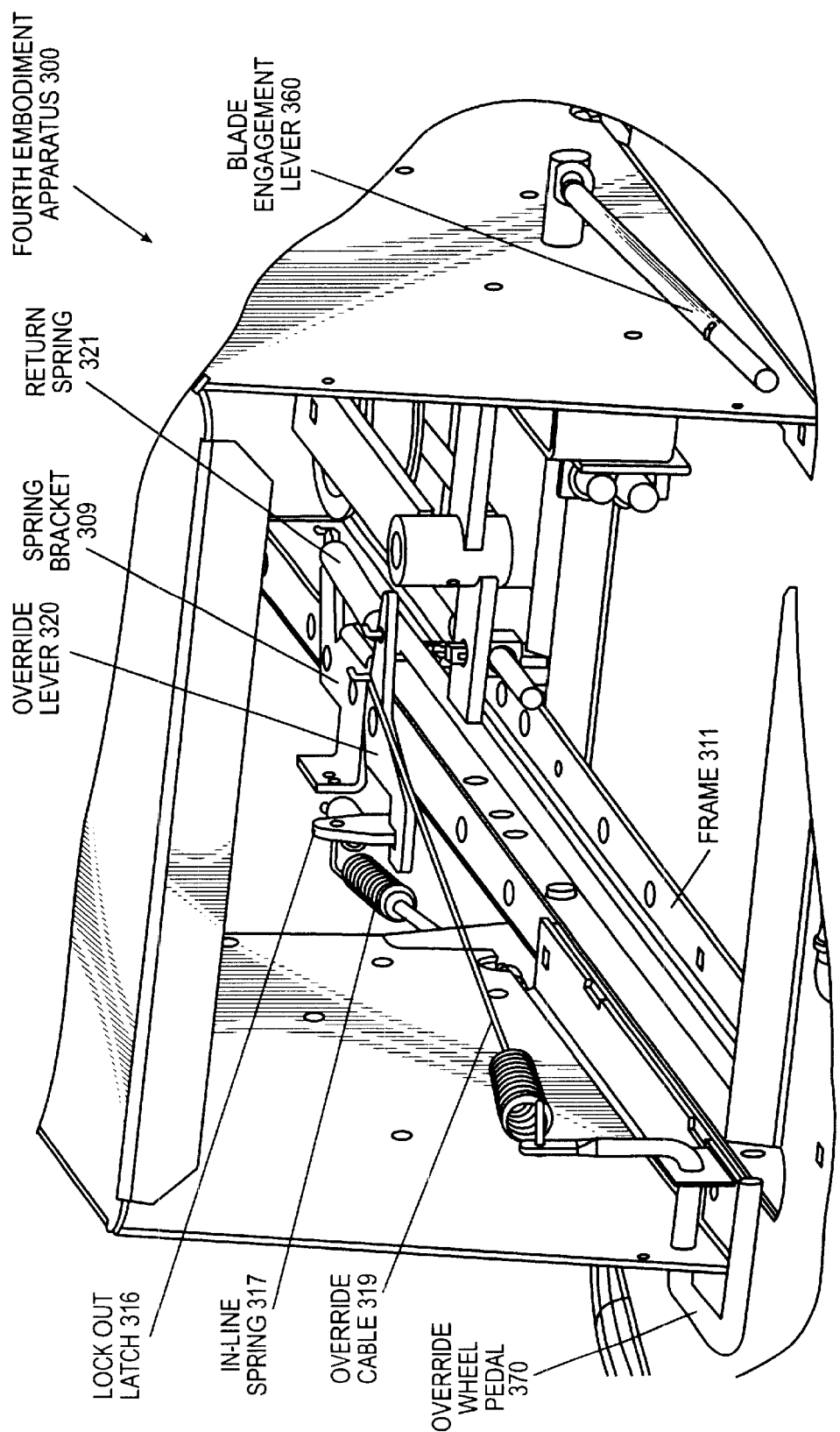

METHOD AND APPARATUS FOR RESTRICTING GRASS CUTTING OF A LAWN MOWER IN REVERSE

RELATED APPLICATIONS

This is a continuation application of U.S. application Ser. No. 09/586,368, filed Jun. 2, 2000, now U.S. Pat. No. 6,405,513, which claims priority to U.S. provisional serial No. 60/137,577, filed Jun. 4, 1999; U.S. provisional application serial No. 60/147,370, filed Aug. 5, 1999; and U.S. provisional application serial No. 60/152,767 filed Sep. 3, 1999. The present application claims the full benefit and priority of all of said applications, and incorporates by reference the contents of same.

TECHNICAL FIELD

The present invention relates generally to vegetation cutting, and more particularly relates to a grass cutting device which includes a reverse safety feature

BACKGROUND OF THE INVENTION

Lawn mowers and the like have been in use for many years. Such lawn mowers can include "riding" lawn movers, such as rear engine riders or lawn or garden ractors.

Such mowers allow for the cutting of grass or other vegetation in forward, neutral, or reverse.

There has recently been recognized a need in the art to provide an improved lawn mower which prevents or at least limits reverse operation of the lawn mower while the cutting blade is engaged.

SUMMARY OF THE INVENTION

The present invention overcomes deficiencies in the art by providing a lawn grass or other vegetation cutting apparatus and method of using same which precludes a lawn mower from going into reverse unless the lawn mower blade is first disengaged, while allowing the lawn mower cutting blade to be reengaged upon being placed in reverse, said latch nevertheless allowing the lawn mower to be moved out of reverse without disengaging said lawn mower blade.

Generally described, a lawn mower apparatus capable of cutting grass or other vegetation, the apparatus comprising a cutting blade capable of cutting the grass or other vegetation, a cutting blade control selectively movable between a cutting position and an idle, non-cutting, position, for causing the cutting blade to be either in a cutting mode or an idle mode, respectively, a shift lever selectively moveable between a forward and a reverse position, for causing forward and rearward movement of the lawn mower, respectively, a reverse lock out latch movable between a blocking position and a cleared position, the reverse lock out latch when in the cleared position configured to allow movement of the shift lever between the forward and reverse positions, the reverse lock out latch when in the blocking position configured to block movement of the shift lever from the forward position towards the reverse position, the reverse lock out latch also configured to be moved into the blocked position when the shift is in the reverse position, and control linkage intermediate the cutting blade control and the reverse lock out latch, the control linkage configured to cause the reverse lock out latch to be moved to the blocking position when the blade is in the cutting mode, such that if a user attempts to shift the lawn mower from forward to reverse movement by use of the shift lever while the blade is in the cutting mode, the cutting blade control must first be moved into the idle position to allow the reverse locking latch to move to the cleared position, whereupon the shift lever may then be moved to the reverse position and then the cutting blade control may be moved back into the cutting mode to cut in reverse.

Therefore it is an object of the present invention to provide an improved lawn mower.

It is a further object of the present invention to provide an improved lawn mower which at least initially prevents the user from placing the mower into reverse when the cutting blade is engaged.

It is a further object of the present invention to provide an improved lawn mower which prevents the user from placing the mower into reverse when the cutting blade is engaged unless a separate overriding control is used.

It is a further object of the present invention to provide an improved lawn mower which allows the user to evaluate the cutting process when placing the mower into reverse.

Other objects, features, and advantages of the present invention will become apparent upon reading the following detailed description of the preferred embodiment of the invention when taken in conjunction with the drawing and the appended claims.

BRIEF DESCRIPTION OF THE DRAWINGS

FIG. 2A shows the blade engaged, and reverse selection blocked by the lock out latch 16.

FIG. 2B shows the blade engagement (a.k.a. blade control) lever 60 moved to its disengaged position, such that the blade is disengaged, and reverse selection is no longer blocked by the lock out latch 16. In FIG. 2C, once reverse has been selected, the blade has been re-engaged. In the FIG. 2D shows the one-way feature of the latch 16, which allows for movement of the latch without disengagement of the blade.

FIG. 3 is a pictorial exploded view of a portion of the first embodiment, which can include an override lever 20 which can be used in conjunction with a reverse lock out latch 16 within the first embodiment of the present invention.

FIG. 5 is a view of a latch assembly 100, assembled from elements shown in FIG. 4, with the latch assembly in exploded view relative to other portions which allow for solenoid operation of the latch assembly 100.

FIG. 7 is a side elevational view of a portion of a fourth embodiment of the present invention 300, which includes the use of a lock out latch 316 in conjunction in an override lever 320.

FIG. 8 is a pictorial view of a fourth embodiment of the present invention, viewed from the front of the unit, with a cover plate removed.

DETAILED DESCRIPTION OF THE PREFERRED EMBODIMENT

Reference is now made to the drawings, in which like numerals indicate like elements throughout the several views.

By way of additional reference, discussion will be made of a cutting blade being "engaged" or "disengaged". This means the blade is in its rotating (a.k.a. cutting) mode, or in its stationary (a.k.a. not cutting) mode.

Generally described, the apparatuses according to the present invention are directed towards means and processes which address a need to at least momentarily stop the cutting process of a lawn mower when in a reversing mode.

First Embodiment—Mechanical Rear Engine Rider FIGS. 1A–1C, 2A–2D, and 3

Under this embodiment, an apparatus according to the present invention includes a lock out latch mechanism 16 which is configured to block the movement of a shift lever 12 from being moved from forward through neutral to the reverse position while and associated cutting blade is in its "engaged" position, unless the operator first disengages the cutting blade. Only once and while the blade is disengaged can the lawn mower then be shifted into reverse. While in the reverse position, the cutting blade can again be reengaged to resume grass cutting.

If the blade is engaged while the mower is in the reverse position, the lawn mower can be shifted from reverse through neutral to forward without disengaging the cutting blade.

The above operation is provided by use of a "one-way" latch 16 which can be selectively placed into the path of the shift lever 12 between the neutral and reverse position. The "one-way" lock out latch 16 is placed into position whenever the cutting blade is placed into its engaged position.

Figure 1A:
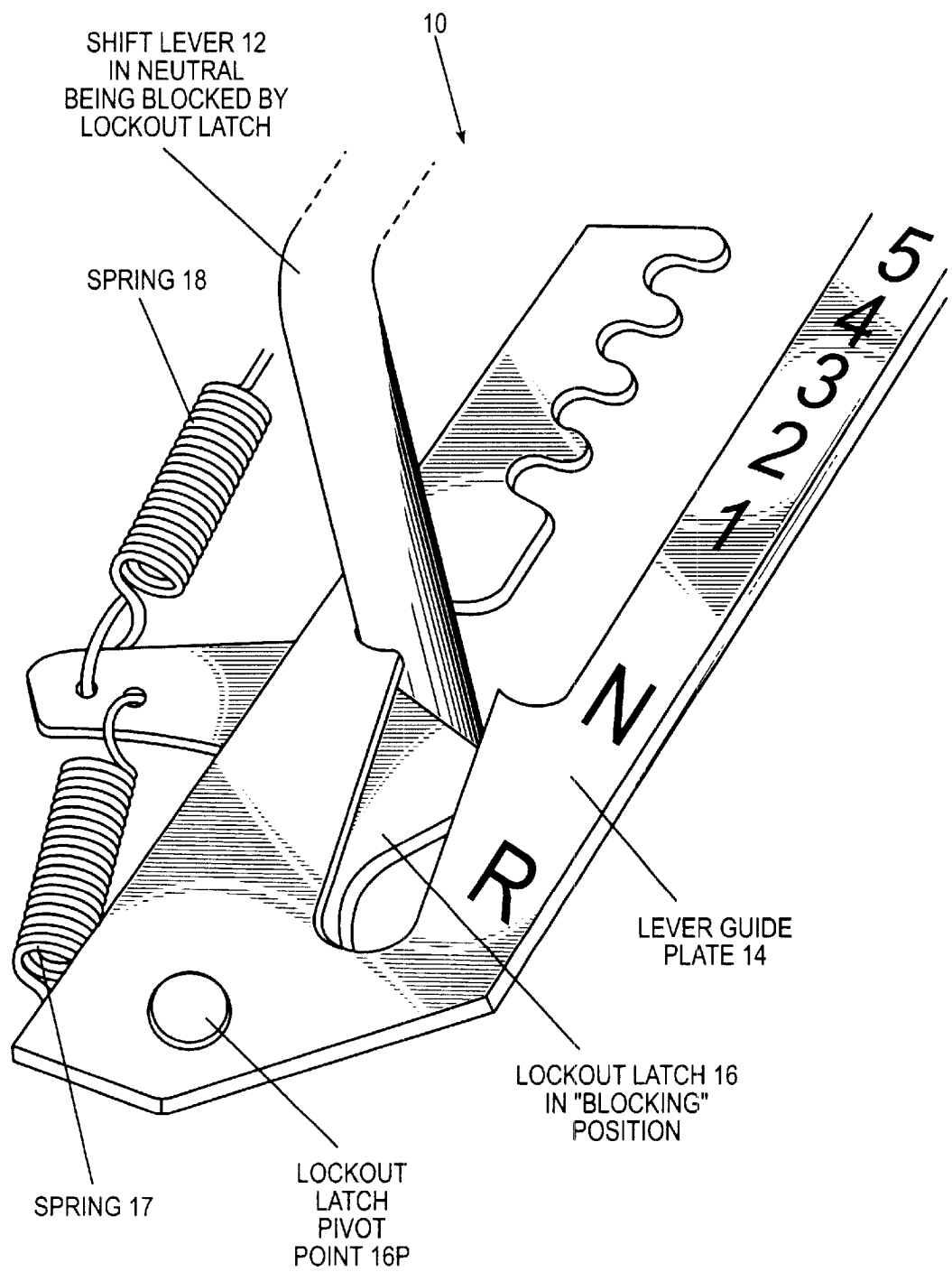
FIG. 1A shows a first embodiment shift lever 12 (a.k.a. speed selection lever) in neutral being blocked by a lock out latch 16 according to the present invention.

Reference is now made to FIG. 1A, which shows the one-way reverse lock out latch 16 in place, blocking the speed control lever 12 from moving from the neutral to the reverse position.

In one embodiment, the reverse lock out latch 16 is moved into place when a foot-depressed pedal is placed in the down position, which in the applicant's configuration retains the cutting blade in its engaged position until the operator removes his or her foot from the pedal. However, other configurations are contemplated, such as the electric configurations noted below.

Figure 1B:
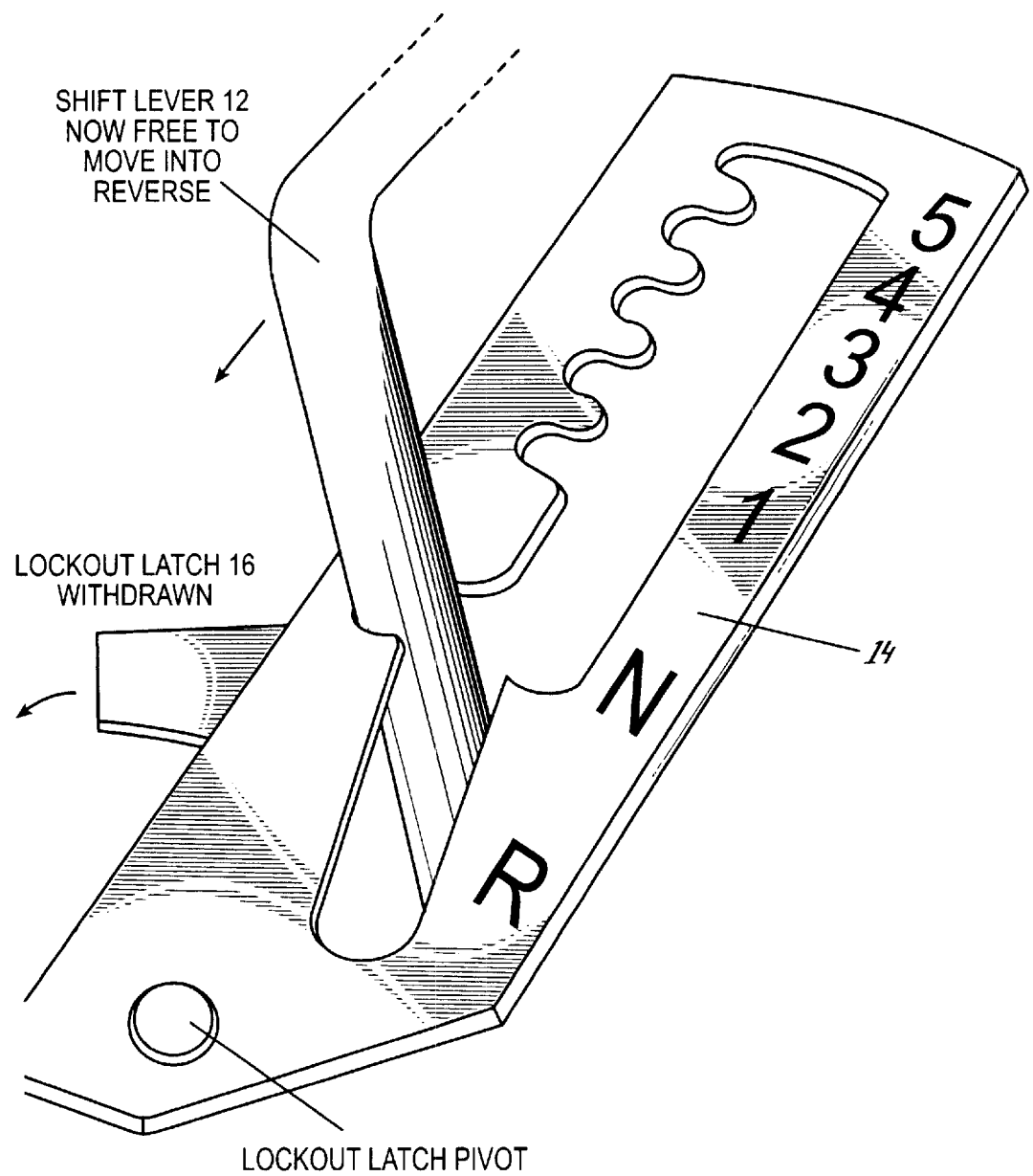
FIG. 1B shows the shift lever free to move from forward through neutral into reverse, as the lock out latch 16 is out of its path.

Two tension springs 17 and 18, such as shown in the figures, are attached to the reverse lock out latch 16. Tension spring 17 tends to maintain the latch in its "unblocking" position, and the other spring 18 (between the latch and the control cable leading to the foot pedal) tends to maintain the latch in its "blocking" position. These springs allow for the "snap-back" feature of the latch as noted below. When the blade is disengaged, the reverse lock out latch 16 moves out of the path of the lever 12 as shown in FIG. 1B. This allows the lever 12 to be moved into the reverse position if desired. Thus it may be seen that this control technique precludes movement into reverse while cutting.

Figure 1C:
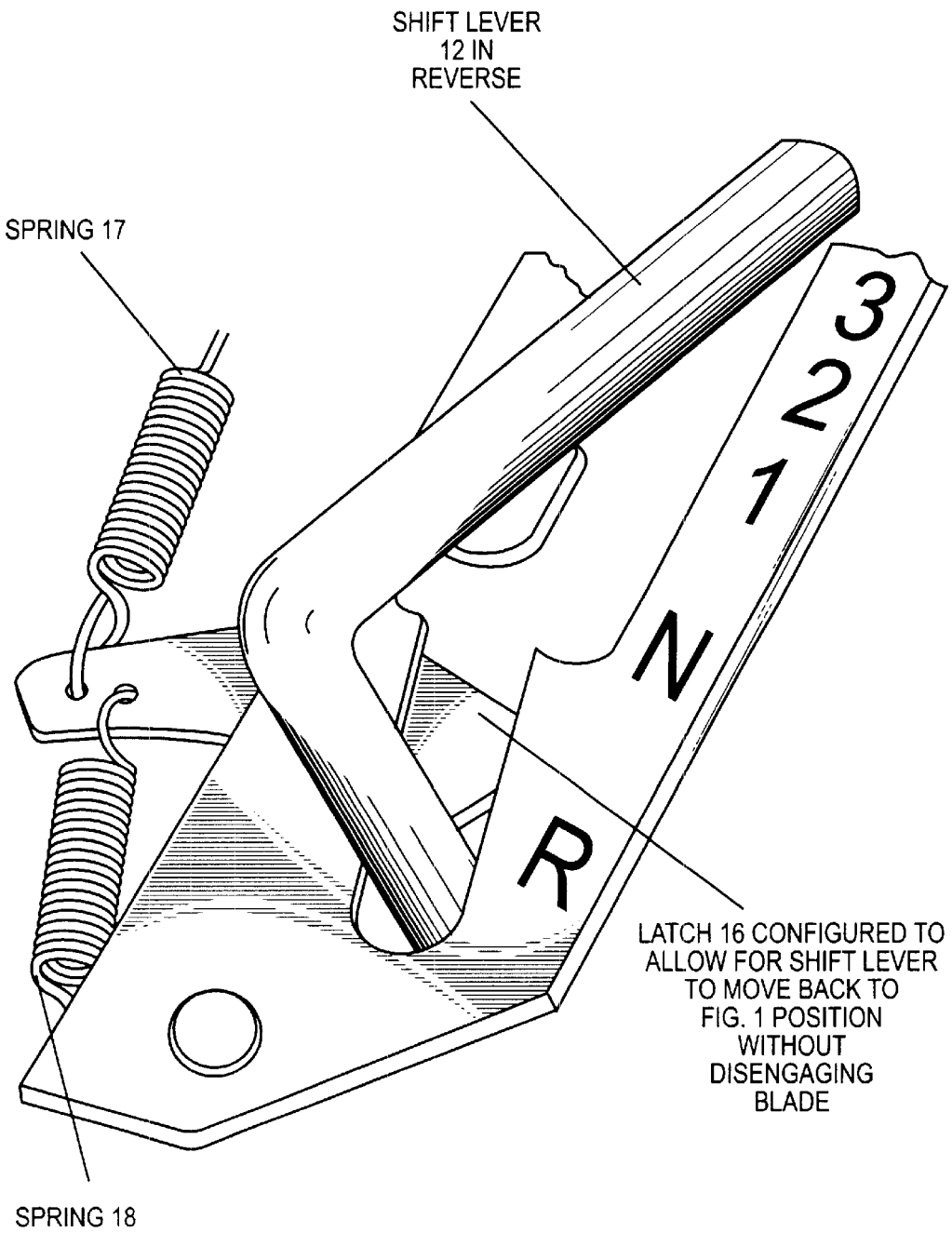
FIG. 1C shows the shift lever 12 in reverse, although it is free to move into forward by biasing against and pivoting the latch 16 out of the way. It may be understood that the latch will then "snap" back into place as shown in FIG. 1.

Referring now to FIG. 1C, the shift lever is moved into reverse. At this point, should cutting be desired, the cutting control is re-activated (in applicant's device this can be done by depressing the above-referenced foot pedal and moving the blade engagement lever to the engaged position), thus engaging the cutting blades and moving the latch to its position shown in FIG. 1C.

At this point, the operator may then desire to place the mower into a forward cutting mode. This does not require disengagement of the blade due to the one-way feature of the reverse lock out latch 16. The operator simply pushes the lever 12 past the reverse lock out latch 16, which pivots out of the way against the force of tension spring 18. When the lever 12 reaches the neutral position, assuming the cutting blade is still engaged the latch will "snap back" into its position in FIG. 1A.

Figure 2A:
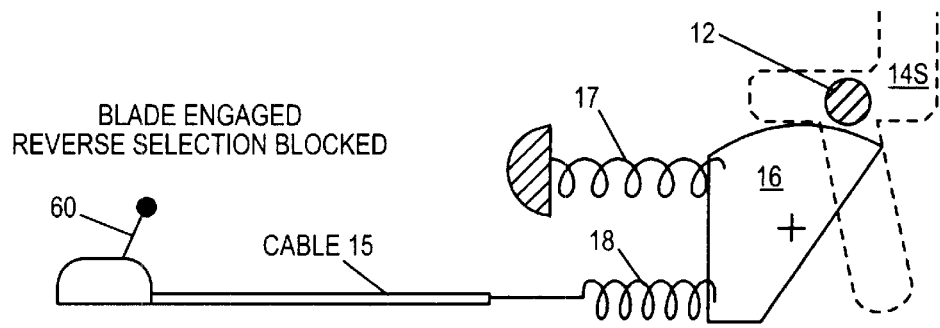
FIGS. 2A–2D show a typical sequence of operation of the apparatus according to the first embodiment.
Figure 2B:
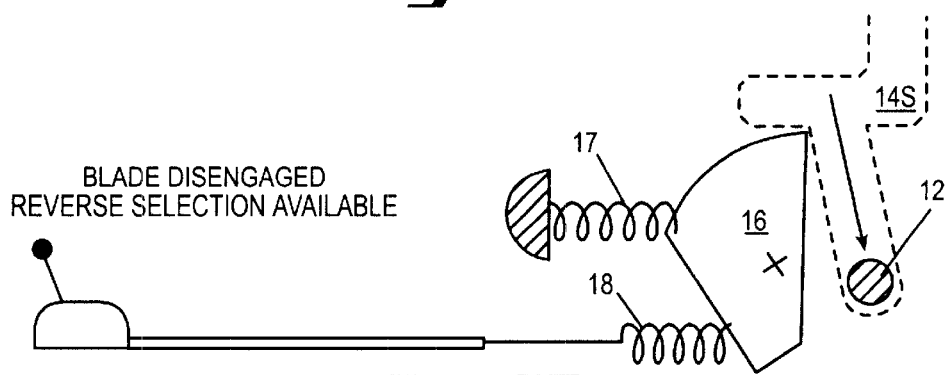
Figure 2C:
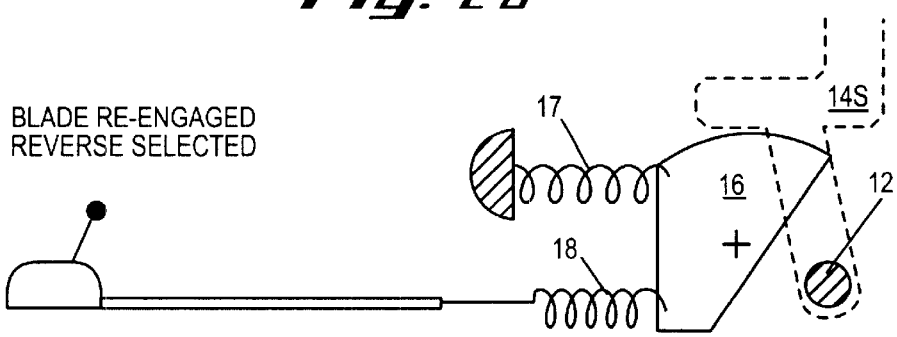
Figure 2D:
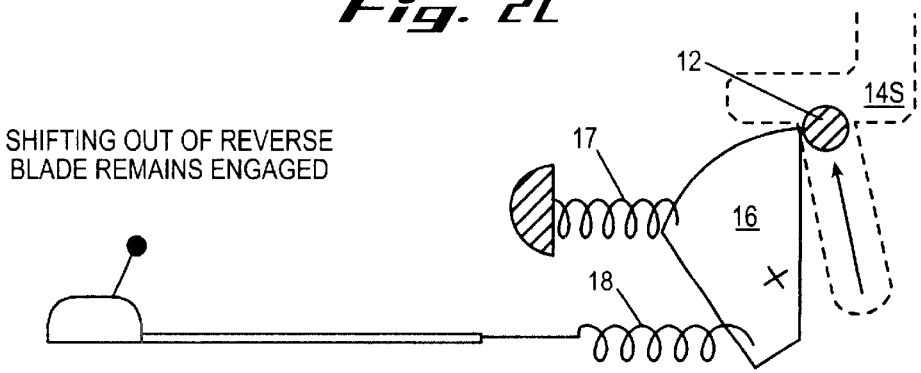
Figure 1:
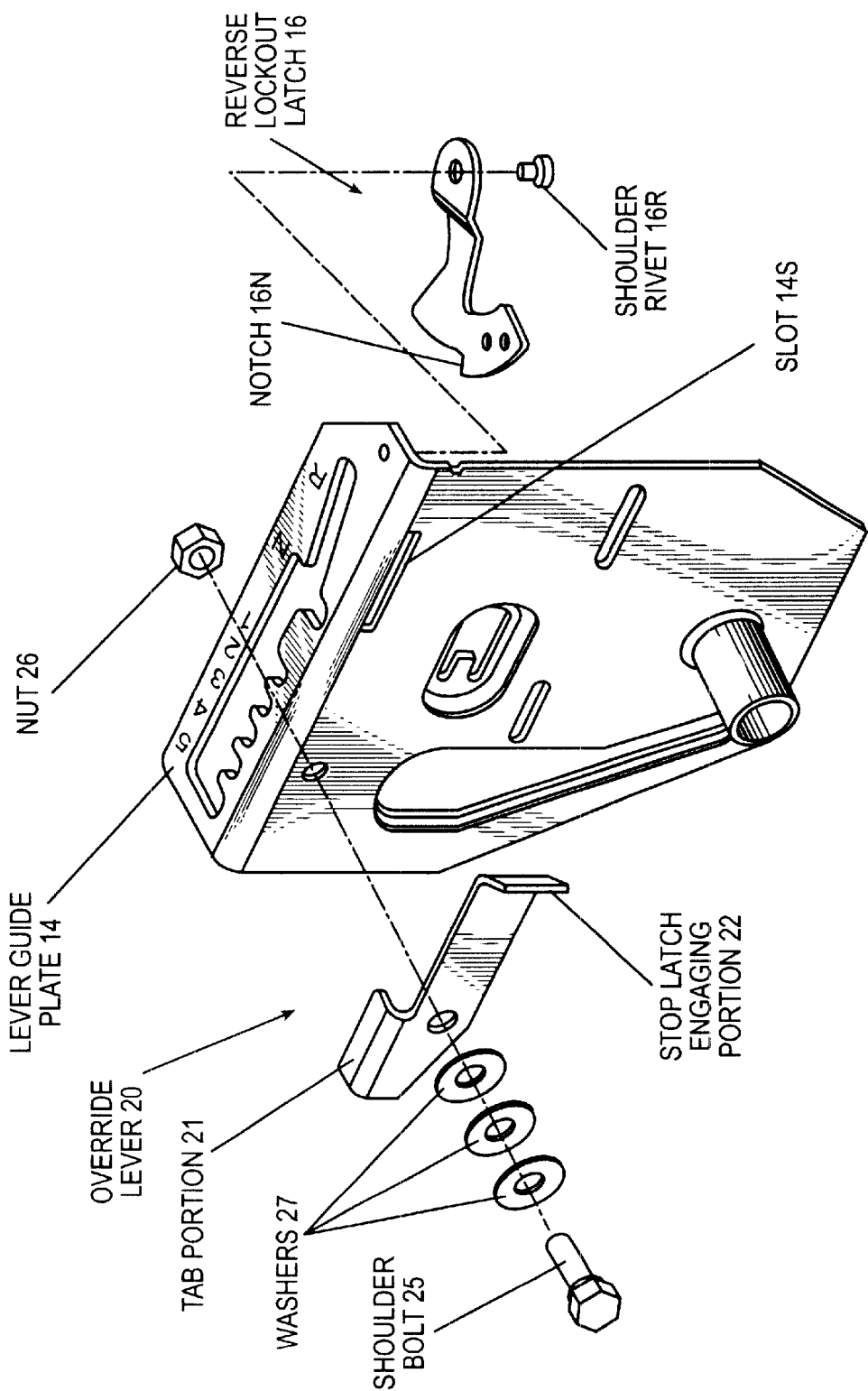

FIGS. 2A–2C also show a typical sequence of operation of the apparatus according to the first embodiment. FIG. 2A shows the blade engaged, and reverse selection blocked by the reverse lock out latch 16. FIG. 2B shows the blade control 60 moved to its disengaged position, such that the blade is disengaged, and reverse selection is no longer blocked by the reverse lock out latch 16. In FIG. 2C, once reverse has been selected, the blade has been re-engaged. In the FIG. 2D shows the one-way feature of the reverse lock out latch 16, which allows for movement of the latch without disengagement of the blade.

Reference is now made to FIG. 3, which shows a preferred optional "override" feature which can be used with the configuration of FIGS. 1A–1C, which provides a separate control for a user to override the reverse lock out latch 16 such that reverse can be selected even while the cutting blade is engaged.

This separate control is provided by use of an override lever 20, which is pivotably attached relative to lever guide plate 14 (a.k.a. "template" or "detent" 14), and can be selectively moved in and out of the pivoting path of the reverse lock out latch 16. When the override lever 20 is in the path of the lock out latch 16, the lock out latch 16 is prevented from pivoting into the path of the shift lever 12. When the override lever 20 is out of the path of the lock out latch 16, it has no effect on the lock out latch 16, and operation is similar to that described above.

The override lever 20 includes a main body portion through which the shoulder bolt passes. Extending from the main body portion include a manually operated tab portion 21, and a stop latch engaging portion 22 which extends generally rearwardly of the body portion at somewhat of an angle.

A shoulder bolt 25 passes through the three shim washers 27, and goes through the sheet metal override lever 20. The shoulder of the shoulder bolt 25 bears against the sheet metal lever guide plate 14. The shoulder bolt is held in place with a nut, rigidly fixing the shoulder relatively to the lever guide plate 14. This allows the override lever 20 to pivot freely relatively to the longitudinal axis of the shoulder bolt and relatively to the lever guide plate 14.

The shoulder bolt connection noted above provides a relatively free pivoting feature, such that gravity will tend to cause the override lever 20 to pivot such that the stop latch engaging portion 22 is in its "down" position, out of the way of the reverse lock out latch 16.

The lock out latch cable spring 18 will be understood to have at least three modes of "stretch"; a least stretched mode, a moderately stretched mode, and a greatest stretched mode. The least stretched mode is the mode at which the blade is not engaged, as for example the mode of FIG. 2B. The moderately stretched mode is the mode at which the blade is engaged and the override lever 20 is not activated, as for example the mode of FIG. 2A or 2C. The greatest stretched mode is the mode at which the blade is engaged and the override lever 20 is also activated. Such a mode could be thought of as being close to that shown in FIG. 2D, although some slight stretching will likely be done as the reverse lock out latch 16 will be held back slightly further away from the path of the speed selection lever 12 in order to prevent contact when shifting from neutral to reverse while in override mode.

Therefore it should be understood that when the override lever 20 is activated and is providing its override function during blade engagement, the lock out latch cable spring 18 is stretched to a greater extent than when the blade is engaged and the override lever is not activating and thus is not providing its override function.

The reverse lock out latch 16 is as noted above the element which provides the "no mow in reverse" feature. It is provided with a "notch" feature at 16N to facilitate engagement with the free end of the stop latch engaging portion 22 of the override lever 20. The reverse lock out latch 16 also includes three holes: one hole to allow it to be pivotably but freely mounted, another hole allowing spring 17 to attach thereto, and another hole allowing spring 18 to attach thereto.

Operation of Override Lever

As noted above, the shoulder bolt connection provides a relatively free pivoting feature, such that gravity will tend to cause the override lever 20 to pivot such that the stop latch engaging portion 22 is in its "down" position, out of the way of the reverse lock out latch 16, with the tab portion 21 sticking up.

When it is desired to "override" the no mow reverse feature, the tab portion 21 of the override lever 20 is pushed down, thus causing the override lever 20 to pivot against the influence of gravity such that the stop latch engaging portion 22 is in the path of the notch portion 16N of the reverse lock out latch 16. At this point, if the blade is engaged, the reverse lock out latch 16 will not pivot due to the it being "locked out" by the override lever 20.

In one configuration, the cable (having a spring 18 in series therewith) can be attached to an ABS (Automatic Blade Stop) pedal, as known in the art, which is used to maintain blade engagement unless released.

Overall Operation

In on of the applicant's configurations, the ABS pedal is configured to keep the blade engaged once the blade has been manually engaged by another lever. However, a cable extending from the ABS pedal is used to operate reverse lock out latch 16.

Under the use of this configuration an operator pushes the ABS pedal down, engages the blade with a hand lever, and as long as the ABS pedal is held down, the blade remains engaged. However, if reverse is desired (without override), the ABS pedal is released (stopping the blade) and reverse is selected. If cutting is again desired while in reverse, the operator again pushes the ABS pedal down and engages the blade with a hand lever.

In order to use the override feature, one must use a hand-foot-hand movement, by using the hand to engage the override lever 20, the foot to engage the ABS, and the hand to engage the blade.

It should be understood that when the override lever 20 has engaged the reverse lock out latch 16, such an engagement essentially locks or binds the two together. Therefore once the override lever has been pushed down and the ABS pedal has been pressed, the override lever is "bound" in position until the ABS pedal is released. This allows the user to release the override lever 20 and to engage the blade with the same hand if so desired.

The reverse lock out latch 16 extends through the slot 14S when installed and in use.

Second Embodiment—Mechanical Lawn/Garden Tractor

FIG. 4

Figure 4:
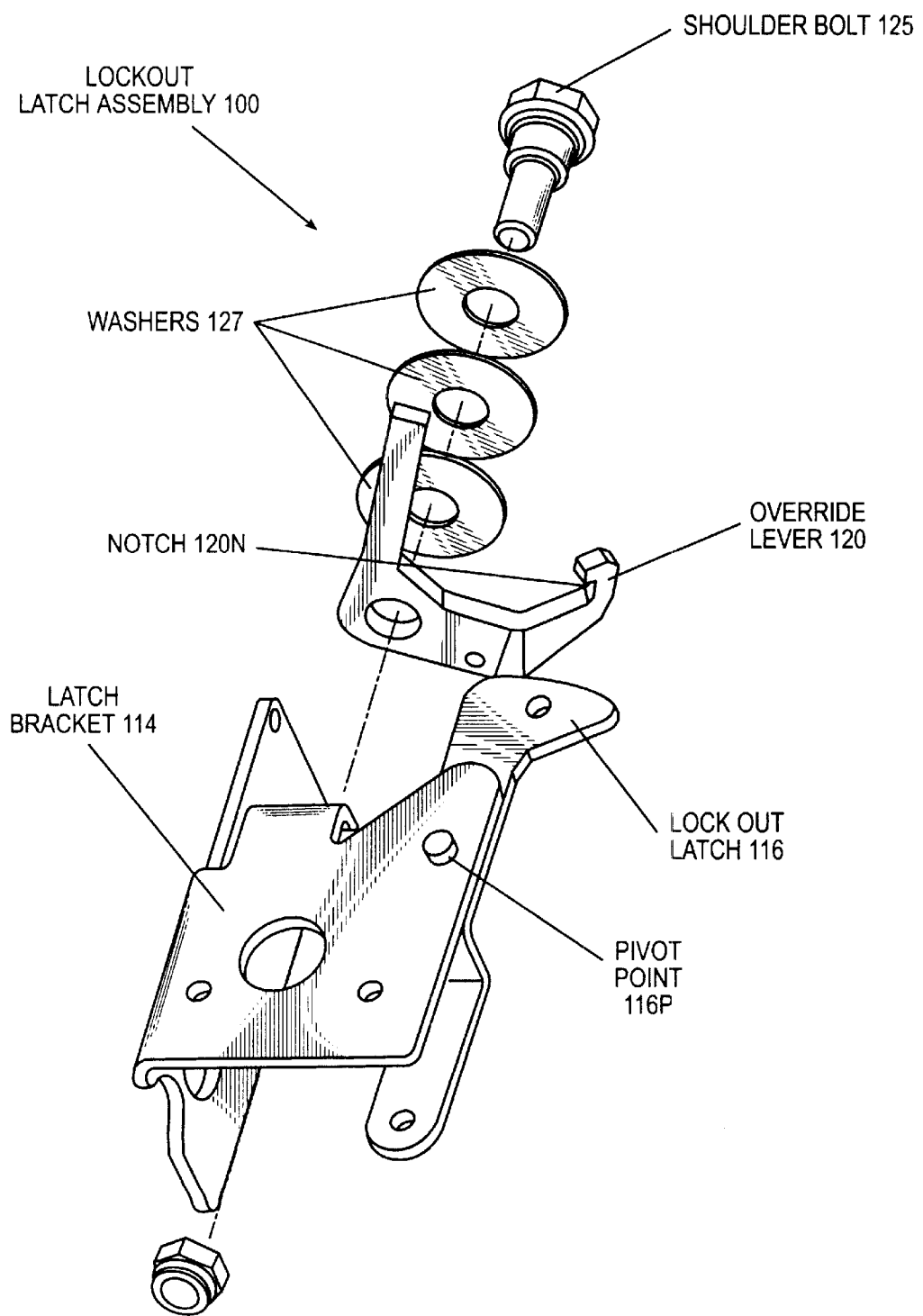
FIG. 4 is a pictorial exploded view of a second embodiment of the present invention 100, which includes the use of an override lever in conjunction with a lock out latch and related assembly.

Reference is now made to FIG. 4, which is an exploded view of a portion of a second embodiment 200 of the present invention. Although such a configuration could be used in a variety of environments, this embodiment is intended by the applicant to be used with a lawn or garden tractor, in which no ABS pedal is used; the blade is engaged simply by movement of a single hand operated control.

Reference is now made to FIG. 4, which shows a lock out assembly 100 which includes:

a shoulder bolt 125, three shim washers 127, an override lever 120, a latch bracket 114, a lock out latch 116 pivotably attached relative to said latch bracket, and a nut 126

The latch bracket 114 is attached relative to the frame of the overall cutting apparatus. The lock out latch 116 is pivotably attached relative to the latch bracket 114 about pivot point 116P. Unless blocked by the override lever 120, the lock out latch 116 pivots 114 about pivot point 116P in response to blade engagement due to the use of conventional cables similar to that discussed above. Such pivoting causes the lock out latch 116 to move into a position which blocks or "locks out" a speed control lever similar to that discussed above, such that the tractor or similar device cannot be moved into reverse unless the blade is disengaged. In one configuration the lock out latch 116 is in place just ahead of blade engagement.

The shoulder bolt 125 is configured to pass through the washers 127, through the hole in the override lever 120, through a hole in the latch bracket 114, and to be captured by the nut 126. Such a configuration allows the override lever 120 to pivot freely relative to the latch bracket 114.

The override lever 120 includes two holes—a large hole configured to accept the shaft of the shoulder bolt and a smaller hole configured to accept a one end of a return spring if so desired. The override lever 120 is normally in a "nonlatching" position due to the influence of gravity, although spring assist may be provided as desired.

The override lever 120 is configured to contain the lock out latch 116 from pivoting into the path of a shift lever such that the latching generally described above can be overridden by engagement of the override latch. As may be understood, this process is generally provided by movement of the override latch into a position such that the open slot notch 120 N in the override lever 120 is configured to accept and retain the thickness of the lock out latch 116, thus preventing it from pivoting to its lock out position. An in-line spring (not shown) similar to the spring 18 noted above is configured to stretch to a sufficient amount to allow the blade to be engaged while the override feature is used.

As noted above, when the override lever 120 is in its "up" or "engaging" position, the lock out latch 116 is captured therein and is prevented from pivoting into its lock out position. It may also be understood that as long as the lock out latch 116 is biased into engagement with the hook of the override latch, the override lever 120 will not fall out of engagement therein, until the lock out latch 116 is withdrawn. This feature allows the override lever 120 to remain engaged until the lock out latch 116 is no longer in engagement with the override lever 120. This engagement can be provided by use of an in-line spring in the cable which activates the lock out latch 116.

It should be understood that since no foot action is required to activate the blade of a tractor using such a configuration, to activate the override feature operation of the apparatus by an operator would be "hand" then "other hand"; one hand would first operate override lever 120, the other hand would engage the cutting blade, and then cutting could be done in forward and reverse without any blocking until the blade was disengaged.

Third Embodiment—Mechanical Tractor With Electric Solenoid BBC

FIGS. 5, 6A, 6B

In this configuration, an electrical solenoid can be used to activate the lock out latch instead of a "mechanical" process such as a connecting cable. This would allow the solenoid to be operated by an electrical PTO switch if so desired.

In reference to FIG. 5, it should be understood that the latch lock out assembly 100 is composed of multiple elements, particularly a general base element and a pivoting latch element.

However, in the embodiment shown, these elements are combined to form the single lock out latch assembly 100.

In this case, an electrical solenoid 150 is used with the assembly 100. As may be understood as the solenoid is activated and deactivated, pivoting of the lock out latch of the latch lock out assembly 100 is provided.

Both mechanical and solenoid uses of the assembly 100 systems have a return spring for the latch. The return spring is in the solenoid in the solenoid version, but is external in the mechanical version. All springing is done towards the off position (no blocking). The spring 153 in the solenoid configuration of FIG. 5 is shown in its fully compressed state.

The U-link 157 connects the plunger 155 of the solenoid, and the lock out latch.

When current is applied to the solenoid 150, it strokes out and pulls the plunger, which pulls the link, which pulls the bottom side of the lock out latch to the left, thus pulling it into the path of the shift lever (not shown).

When on the return stroke, when there is no energization of the solenoid, the compression spring pushes on the rod, which pushes on the link, which pushes on the latch.

Figure 6A:
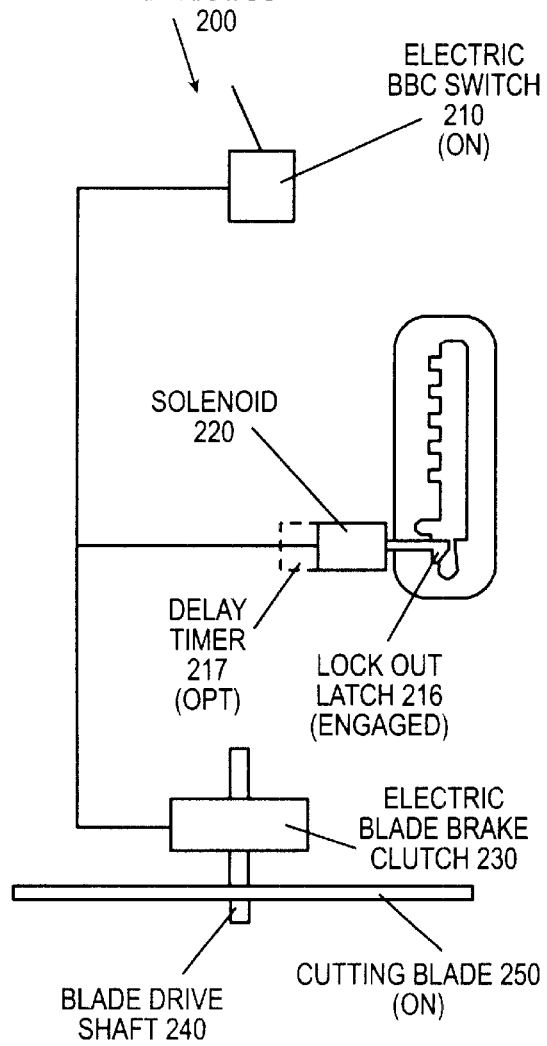
FIGS. 6A and 6B are logical schematic views of a third embodiment 200 according to the present invention, illustrating a electric switch 210 in an on and off position, respectively, controlling various elements thereby, including a blade and a lock out latch.
Figure 6B:
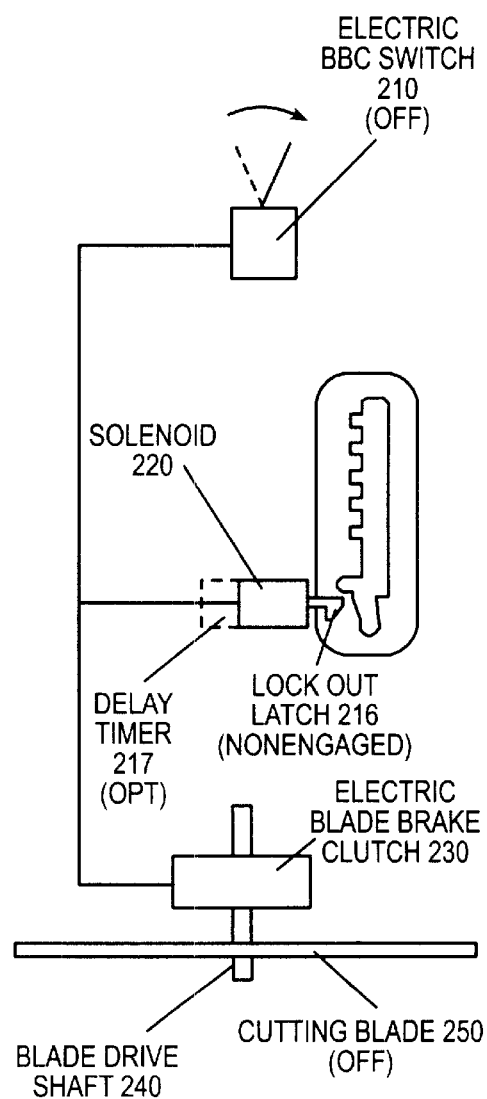
Figure 1:
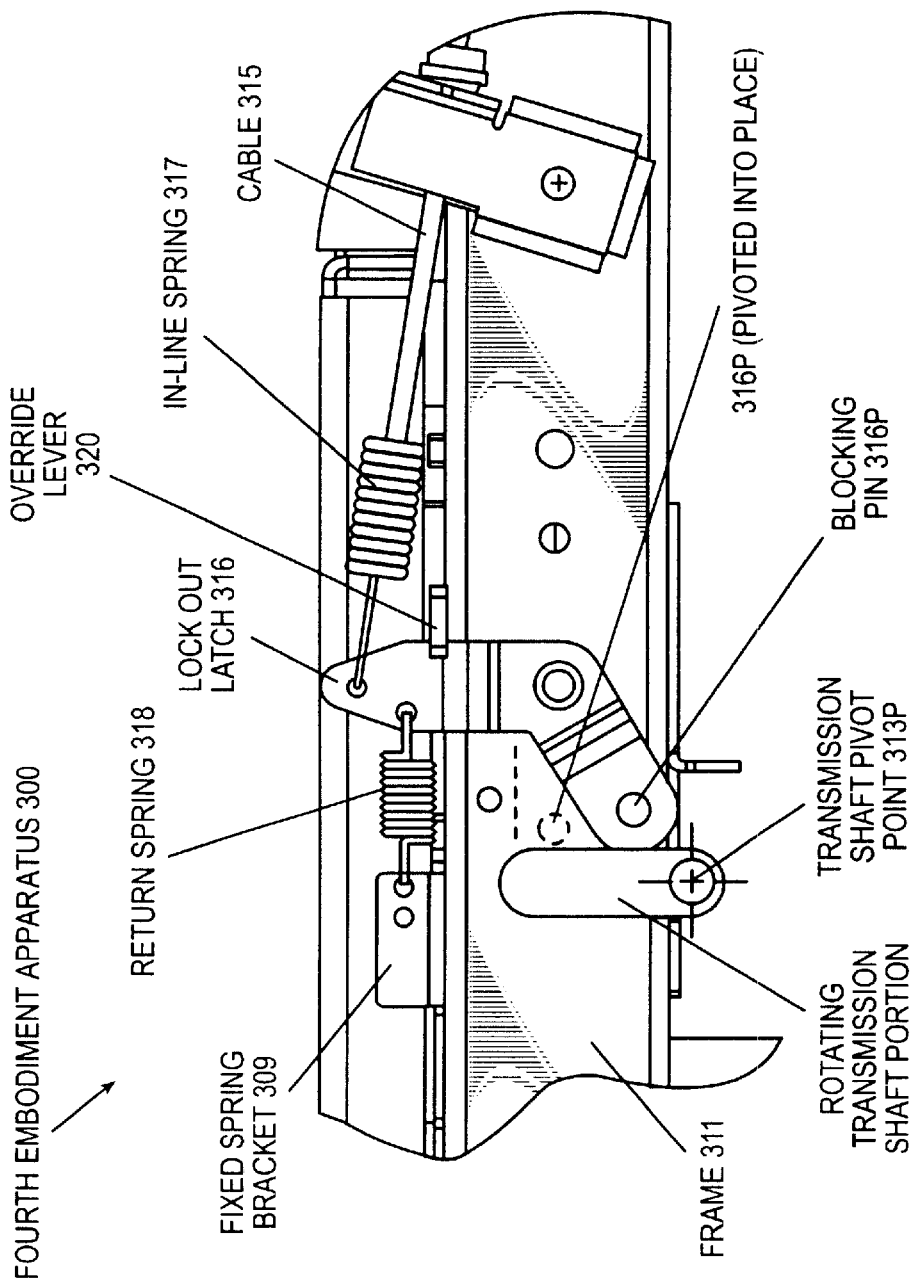

Reference is now made to FIGS. 6A and 6B, which generally illustrate the schematic layout of the embodiment 200, in which electrical means are used to engage and/or disengage a lock out latch 16 (shown only generally for illustrative purposes). For example, if an electrical blade clutch 230 is used to drive a drive shaft 240 driving a cutting blade 250, its electrical circuit could also be used to operate a solenoid 220 which would engage the lock out latch 216.

As may be understood, the sequence of operation of the configuration shown in FIGS. 4A and 4B is similar to that shown in FIGS. 1A–1C and 2A–2D. As an example, the electric switch 210 must be turned off in order to place mower in reverse, but cutting of the cutting blade 250 can be turned back on when reverse has been selected. The one-way blocking feature is also included in the FIGS. 4A–4B configuration, so movement from reverse to forward can be accomplished without interrupting cutting. The one-way switch is not specifically shown in FIGS. 4A–4B for purposes of simplicity, but the latch design shown in FIGS. 1A–1C incorporated therein.

A "time delay" feature could also be used in conjunction with the mechanical or electrical engagement features noted above. In the instance of the electrical engagement configuration described immediately above, a delay timer unit 217 such as shown in dotted line in FIGS. 4A and 4B. The delay timer 217 could be used which would delay the disengagement of the lock out switch for a time period which could correspond to the time it takes for the blade to come to a stop (a.k.a. "blade stop time"). As an example only, such time could be 1–5 seconds.

As noted above, in this configuration, an electrical solenoid 220 could be used to activate the lock out latch instead of a "mechanical" process such as a connecting cable, with the solenoid operated by an electrical PTO switch if so desired. However, it should be understood that the present invention also contemplates the use of a lever which can be attached to a cable to provide the lock out motion, with the lever tripping an electrical switch to operate the PTO switch. This would save the cost of a solenoid.

Fourth Embodiment—Hydrostatic Rear Engine Rider

FIGS. 7, 8, 9, 10, 11

Reference is now made to FIGS. 7–11, which are directed towards a configuration which could be understood as a "hydro rider" version, which includes the use a hydrostatic drive unit which operates in conjunction with a transmission shaft portion which pivots or rotates about a pivot point 313P. It should be understood that the configuration of FIGS. 7–11 is in a blade-engaged, "override", position.

On the embodiments discussed above in conjunction with FIGS. 1–6, a shift lever was being blocked. In the version now being discussed, a lever leading to the transmission is being blocked from going into reverse; this lever is not a shift lever but is closer in the linkage chain towards the transmission.

This embodiment includes:

fixed spring bracket 309, a frame 311, a transmission shaft portion 312 a transmission shaft pivot point 313P a reverse lock out cable 315 a lock out latch 316 a blocking pin 316P an in-line spring 317 a return spring 318 an override cable 319 an override lever 320 an override lever return spring 321 an override heel pedal 370 a blade engagement lever 360, and a return spring 321.

Reverse lock out latch 316 is pivotably mounted relative to the frame 311 of the apparatus about a substantially vertical axis during level cutting operation. Unless the override feature is in use, reverse lock out latch 316 can pivot into and out of the path of the transmission shaft portion 312 as the blade engagement lever is engaged and disengaged, respectively. It may be understood that such movement prevents and allows, respectively, the unit to be placed into reverse. Thus the feature of at least initially preventing mowing in reverse is again provided. As the reverse lock out latch 316 is moved into its "blocking" position, it may be understood that a "pin" portion blocks the movement of the transmission speed control shaft into its reverse position. When the pin is about horizontal with the pivot point of the reverse lock out latch 316, it provides its stopping function as its circumference is contacted.

Lock out latch return spring 318 has one end attached to the stationary spring bracket 309, and its forward end attached to the reverse lock out latch 316, such it tends to move the reverse lock out latch 316 towards its "nonengaged" or "non-blocking" position. This spring force is countered by force which is applied to the reverse lock out cable 315, which has an in-line spring 317. The reverse lock out cable 315 is operably attached relative to a blade engagement means such as a blade engagement lever 360, such that as the blade engagement lever is engaged, the cable 315 (with an in-line spring 317) tends to pull forwardly on the upper end of the reverse lock out latch 316, rotating it into its "blocking" position.

Figure 9:
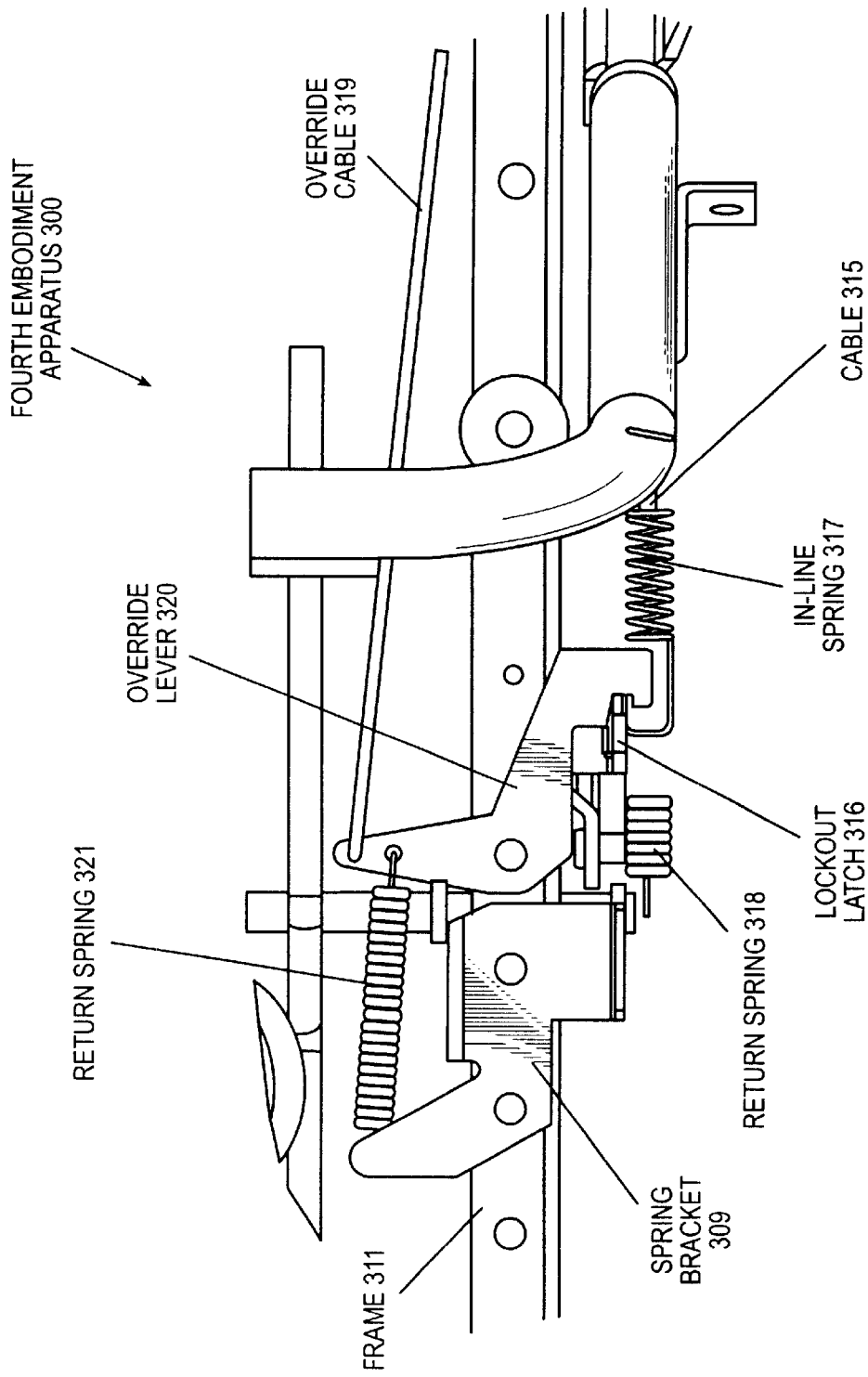
FIG. 9 is an isolated partial top elevation view of a portion of the embodiment 300 according to the present invention.
Figure 10:
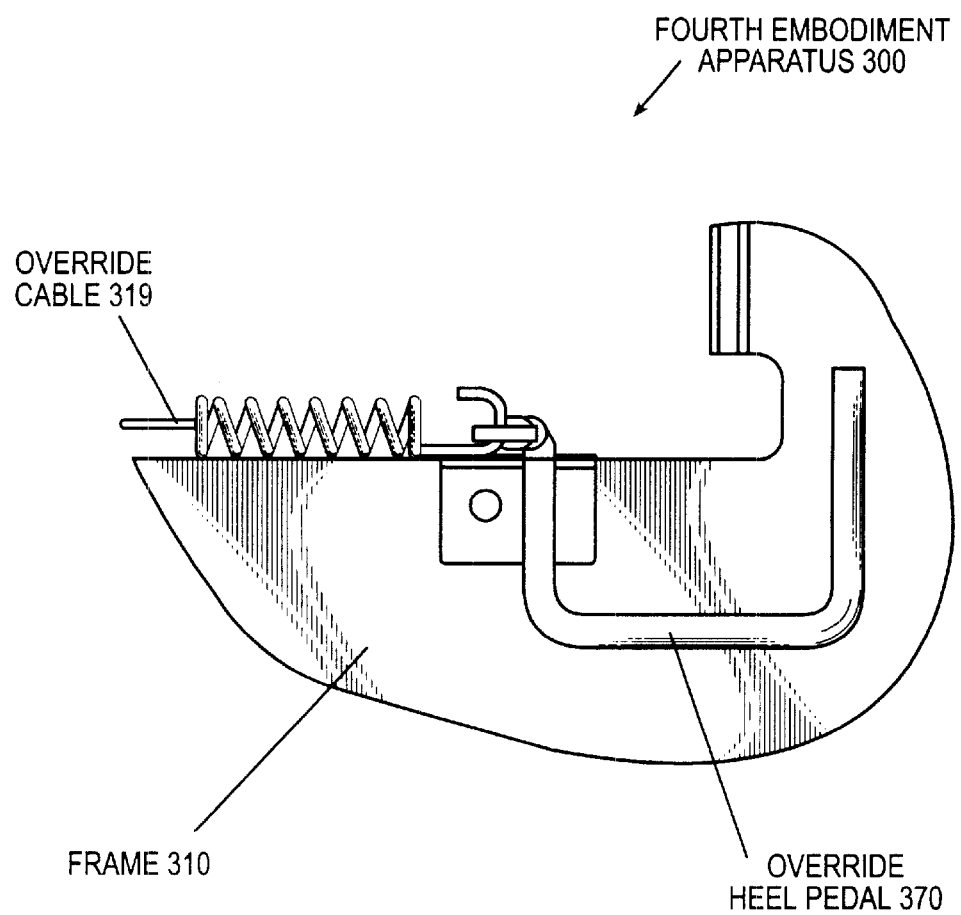
FIG. 10 is an isolated partial top elevational view of a portion of the fourth embodiment of the present invention, which includes an override heel pedal 370 pivotably attached relative to a frame 310 and operated by an override cable 319.
Figure 11:
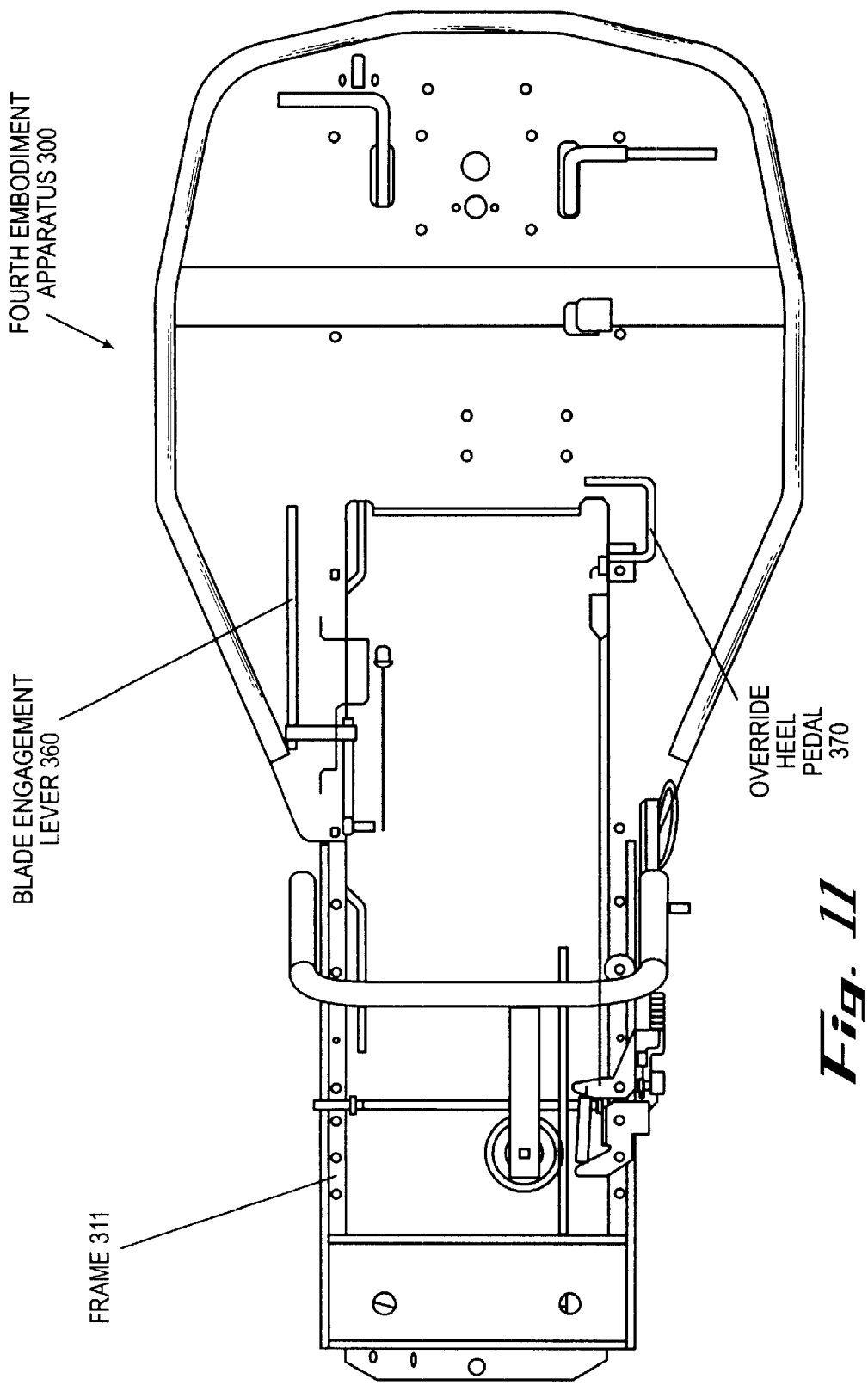
FIG. 11 is a top elevational view of a frame portion of a fourth embodiment of the present invention, with an override heel pedal 370 shown for relative illustrative purposes.

Referring now particularly to FIG. 9, the override lever 320 is pivotably mounted relative to the frame about a vertical axis, and has a override lever return spring 321 attached to it such that it tends to pull the override lever into a nonengaging position. The override lever return spring 321 has its other end attached to a stationary bracket 309. The override lever 320 has a notch to accept the thickness of a part of the lock out latch to engage it in a similar manner as in the other embodiments described above.

An override pedal 370 is pivotably attached relative to the frame 311 of the apparatus in a location which can be accessed by the foot of the operator. The override heel pedal 370 is used to activate the override lever 320 by use of an intermediate override cable 319, which can include an in-line spring as desired. The operator places the operator's heel on the override heel pedal 370 before engaging the blade, thus activating the override feature in a manner similar to that discussed above. This would provide overriding of the no mow in reverse feature.

As noted above, the override heel pedal 370 is configured to provide selectively override or "block" the pivoting movement of the reverse lock out latch 316 (which precludes cutting in reverse), notwithstanding the fact that the cutting blade may be engaged. In this configuration, it should be understood that the in-line spring 317 is extended to its greatest extent in normal operation, although this is accounted for in engineering, and such stretching can be readily repeated without undue failure or fatigue.

It should be understood that the transmission is moved into reverse, and if cutting is desired in reverse, this is possible. When the transmission speed control shaft is in its reverse position, if the blade engagement lever is engaged, the blade engagement lever will pull on the reverse lock out cable, which will attempt to rotate the reverse lock out latch 316. However, the reverse lock out latch 316 will not be able to be rotated, due to its being blocked by the transmission speed control shaft. However, the in-line spring 317 in the cable 315 can again be extended to accommodate this.

Fifth Embodiment—Vacuum Actuation

FIG. 12

Figure 12:
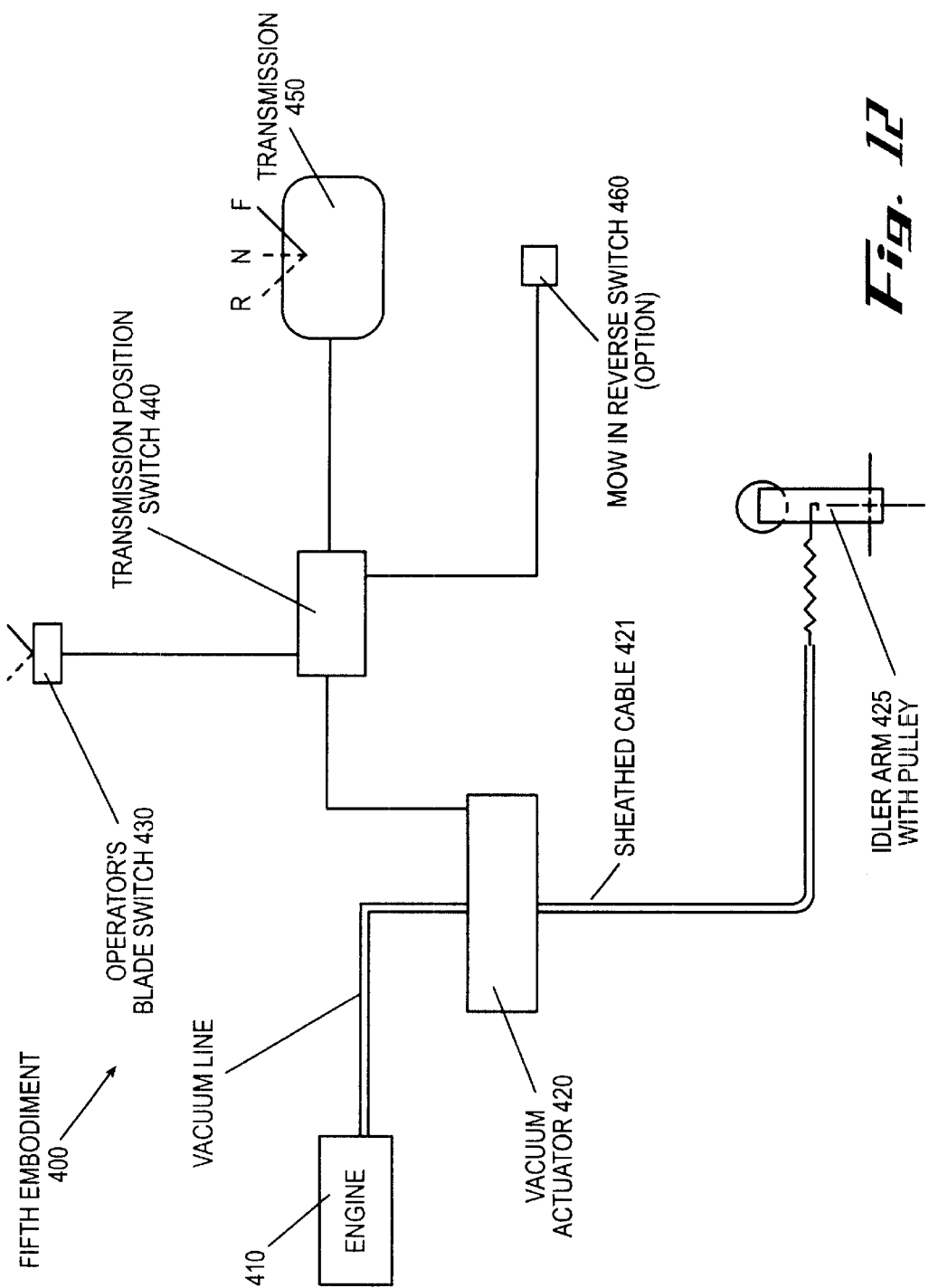
FIG. 12 is a schematic view of a fifth embodiment of the present invention 400, illustrating the interaction between various elements such as switches, transmission position switches, and engine, a vacuum actuator, etc.

Reference is now made to FIG. 12, which is logical schematic view of another embodiment 400, which includes the use of vacuum.

Under this configuration, an engine 410 provides vacuum to operate a vacuum actuator 420 which operates a sheathed cable 421, which pulls an idler arm assembly 425 which engages the blades by means of a belt drive.

The vacuum actuator 420 is turned on and off by a switch 440 which is controlled by the operator.

The vacuum actuator 420 is turned "off" when the transmission position switch 450 senses that the transmission is moved to reverse. This turns off the blades (not shown).

The vacuum actuator 420 is turned "on" when the transmission is moved back to forward.

An operating scenario is as follows. With the engine on, and the transmission is in neutral or forward, if the operator switches the blade control switch on, that engages the blade.

The mow in reverse switch 460, is intended as an override to the transmission position switch. If the operator puts the mower in reverse and pushes the switch 430, the blade starts back up. This will require the blade control switch 430 to be on, and the mow in reverse switch 460 to be pressed.

Under one version, the lawn mower can simply start back in its cutting mode upon reengagement of forward from reverse or neutral. However, a "reset" option is also contemplated in which the reset switch requires the blade control switch 430 to be retriggered when the transmission position switch 450 senses that the transmission is moved to reverse.

Under this configuration, the operator would have to turn the blade switch off, and the turn it back on. It would not automatically come back on when the transmission was moved from reverse into neutral or forward.

Sixth Embodiment—Proximity Sensor w/Vacuum

FIG. 13

This configuration includes the use of a proximity sensor 590, which activates an electrical switch. The switch can kill the engine (option "1"), deactivate the vacuum actuator 520 to stop the mower blade (option "2"), or deactivate the transmission (option "3").

Proximity sensor types can include ultrasonic sensors or infrared sensors (to pick up body heat).

An external object proximity sensor 590 such as a protective back-up bar could provided across the rear of the machine or along other peripheral areas. This bar would activate a switch when contact is made with an object.

With the bar concept, the machine must be moved away from the object that the protective bar contacted before the bar can be reset and the engine and blades restarted.

The proximity sensor 590 may only work when in the reverse mode, as it could be falsely triggered when in forward mode, such as making a turn which suddenly brings something in the rear range of the unit.

Seventh Embodiment—Proximity Sensor—No Vacuum

FIG. 14

Figure 13:
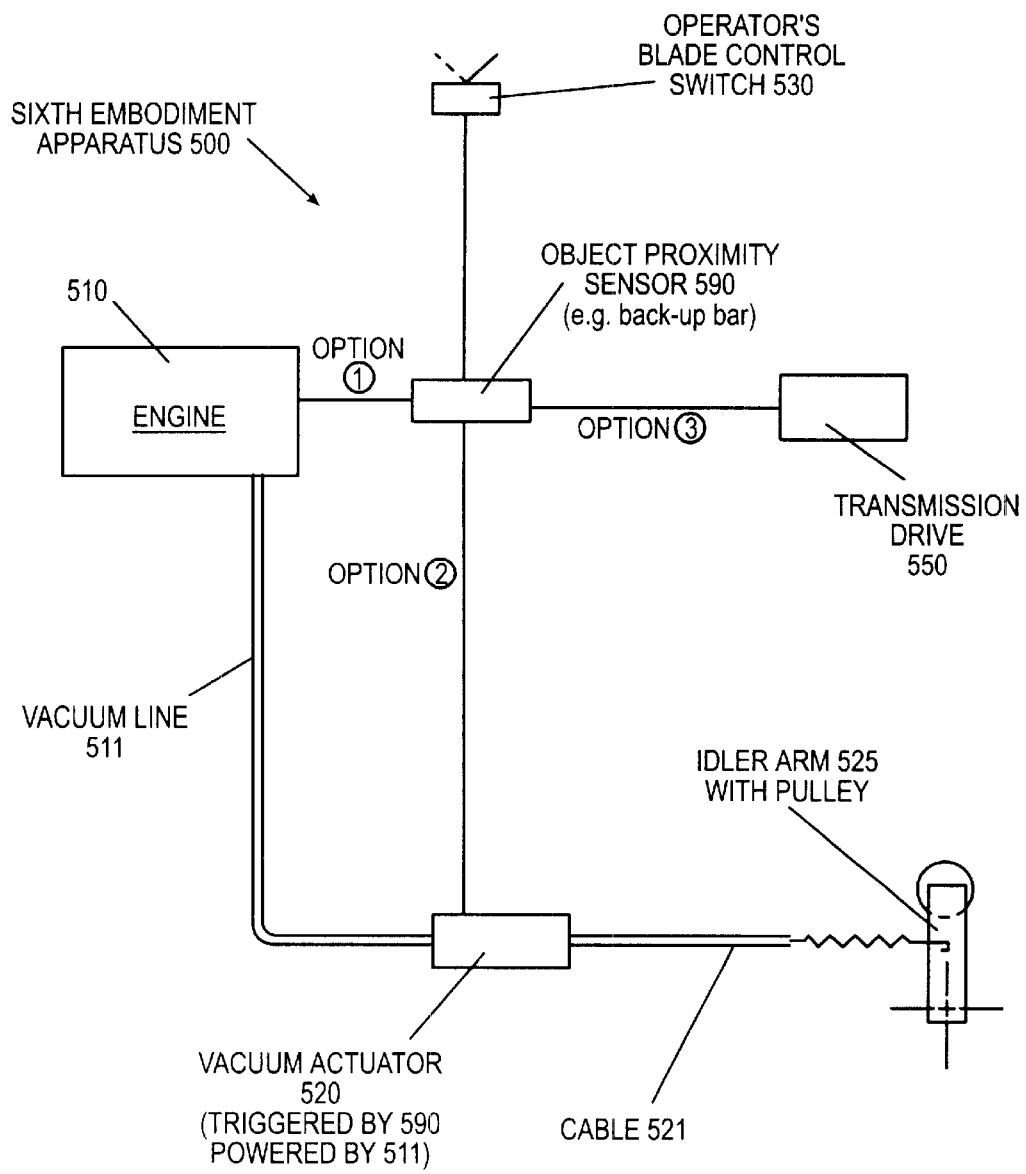
FIG. 13 is a schematic view of a sixth embodiment according to the present invention 500, including an object proximity sensor.
Figure 14:
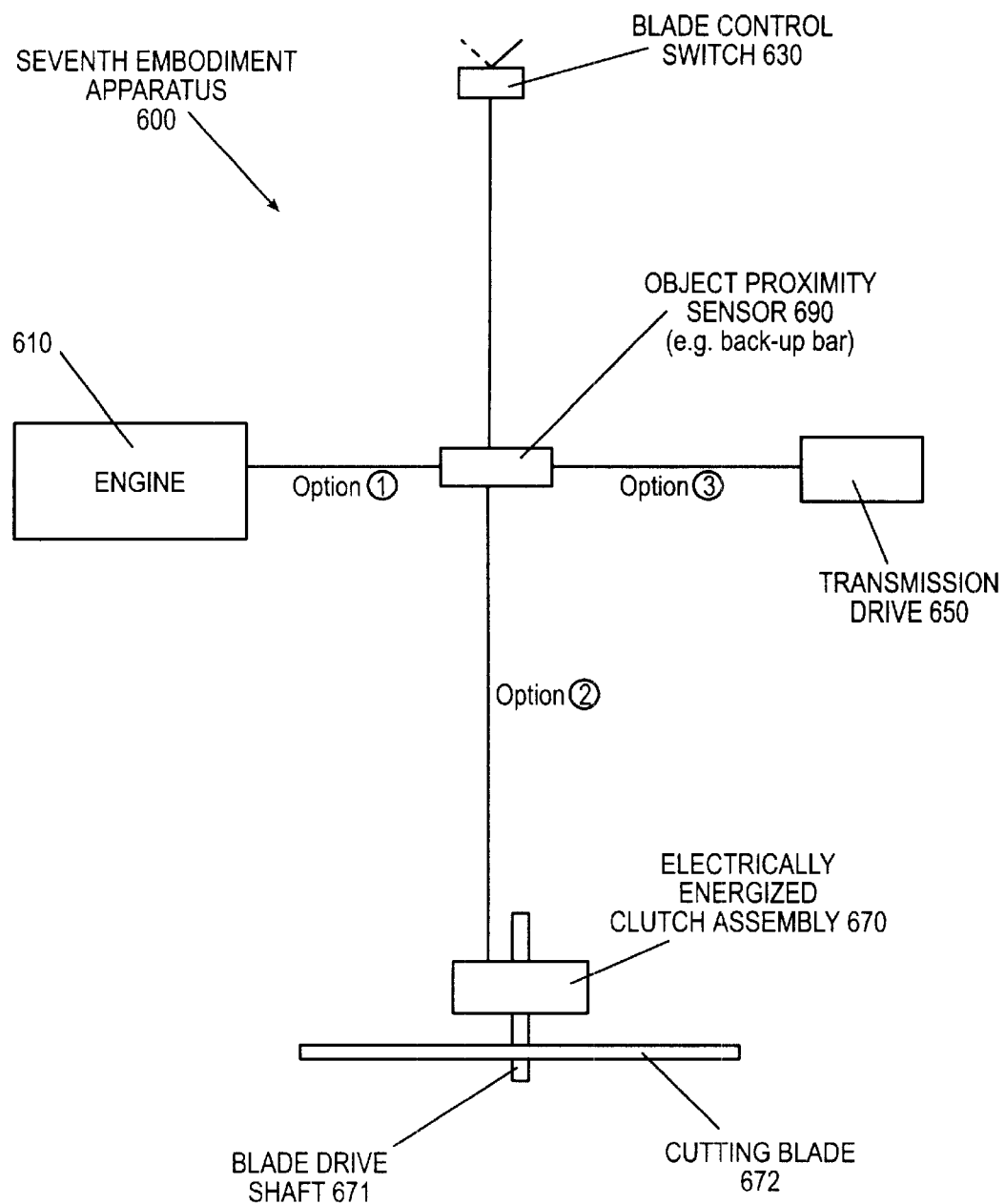
FIG. 14 is a schematic view of a seventh embodiment 600 of the present invention, including an object proximity sensor.
Figure 15:
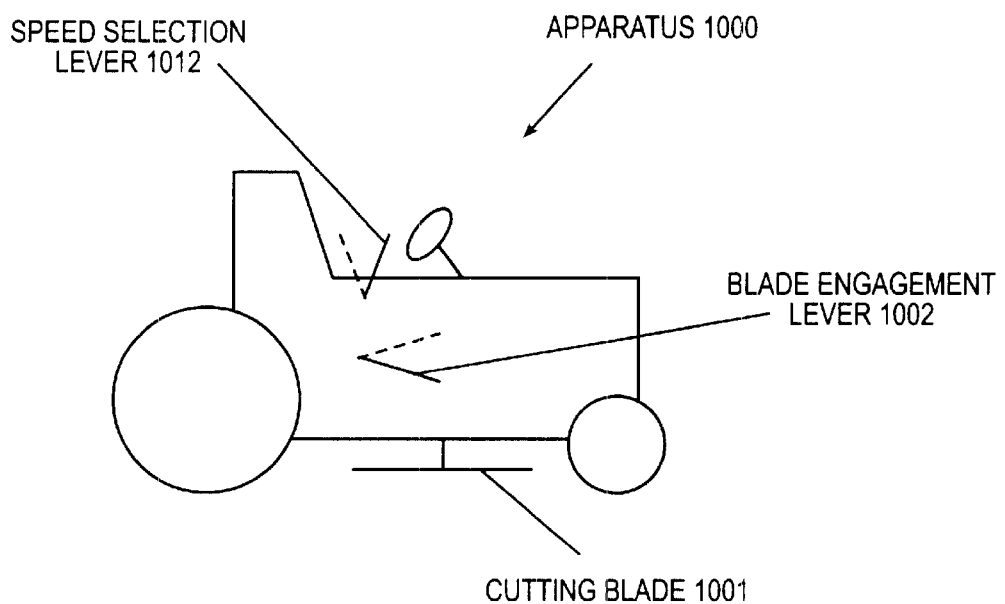
FIG. 15 is a side elevational view of an exemplary lawn mower mechanism 1000 which includes a shift lever 1012 (a.k.a. speed selection lever) which is used to select the speed and direction of the lawn mower mechanism 1000. The mechanism 1000 includes a cutting blade 1001 which can be operated by a blade engagement lever 1002. This exemplary lawn mower 1000 can be used within the various embodiments of the present invention.

This version is similar to FIG. 13 above except that no vacuum is used and an electrical clutch assembly is used. This embodiment includes an engine 610, an operator's blade control switch 670, an object proximity sensor 690, a transmission drive 650, an electrically engerized clutch assembly 670, a blade drive shaft 671, and a cutting blade 672.

CONCLUSION

Therefore it may be seen that a lock out feature is provide for preventing a lawn mower from going into reverse unless the lawn mower blade is first disengaged, while allowing the lawn mower cutting blade to be reengaged upon being placed in reverse, said latch nevertheless allowing the lawn mower to be moved out of reverse without disengaging said lawn mower blade. An override feature is also provided, which allows use of a separate override control to allow the user to override the reverse lock out latch in order to go from forward or neutral into reverse without disengaging the cutting blade.

While this invention has been described in specific detail with reference to the disclosed embodiments, it will be understood that many variations and modifications may be effected within the spirit and scope of the invention as described in the appended claims.

What is claimed is:

1. A method of providing a lawn mower apparatus capable of cutting grass or other vegetation, said method of providing a lawn mower apparatus comprising the steps of:

providing a cutting blade capable of cutting said grass or other vegetation;

providing a cutting blade control selectively movable between a cutting position and an idle, non-cutting, position, for causing said cutting blade to be either in a cutting mode or an idle mode, respectively;

providing a shift lever selectively moveable between a forward and a reverse position, for causing forward and rearward movement of said lawn mower apparatus, respectively;

providing a reverse lock out latch movable between a blocking position and a cleared position, said reverse lock out latch when in said cleared position configured to allow movement of said shift lever between said forward and reverse positions, said reverse lock out latch when in said blocking position configured to block movement of said shift lever from said forward position towards said reverse position, said reverse lock out latch also configured to be capable of being moved into said blocking position when said shift lever is in said reverse position;

providing at least one control linkage intermediate said cutting blade control and said reverse lock out latch, said control linkage configured in one operational mode to cause said reverse lock out latch to be moved to said blocking position when said cutting blade control is moved to said cutting position; and operating said lawn mower apparatus such that if a user attempts to shift said lawn mower apparatus from forward to reverse movement by use of said shift lever while said cutting blade is in said cutting mode and said control linkage is in said one operational mode, said cutting blade control must first be moved into said idle position to allow said reverse lock out latch to move to said cleared position, whereupon said shift lever may then be moved to said reverse position and then said cutting blade control may be moved back into said cutting position to cut in reverse.

2. The method of providing a lawn mower apparatus claimed above in claim 1, wherein said shift lever is provide to go through neutral when going from forward to reverse, and wherein said reverse lock out latch, when provided in said blocking position, precludes movement of said shift lever from neutral to reverse.

3. The method of providing a lawn mower apparatus claimed above in claim 1, wherein said reverse lock out latch is provided to include a pivotable latch configured to be placed in and out of the path of said shift lever depending on whether said cutting blade is engaged or disengaged, respectively.

4. The method of providing a lawn mower apparatus claimed above in claim 1, wherein said reverse lock out latch is provided to include a latch configured to be placed in and out of the path of said shift lever depending on whether said cutting blade is engaged or disengaged, said latch configured to be operated by a flexible cable.

5. The method of providing a lawn mower apparatus claimed above in claim 1, wherein said reverse lock out latch includes a latch configured to be placed in and out of the path of said shift lever depending on whether said cutting blade is engaged or disengaged, said latch configured to be operated by an electrical solenoid.

6. A method of providing a lawn mower capable of cutting grass or other vegetation, said method comprising the steps of:

providing a cutting blade capable of cutting said grass or other vegetation;

providing a cutting blade control selectively movable between a cutting position and an idle, non-cutting, position, for causing said cutting blade to be either in a cutting mode or an idle mode, respectively;

providing a shift lever selectively moveable between a forward and a reverse position, for causing forward and rearward movement of said lawn mower, respectively;

providing a reverse lock out latch movable between a blocking position and a cleared position, said reverse lock out latch when in said cleared position configured to allow movement of said shift lever between said forward and reverse positions, said reverse lock out latch when in said blocking position configured to block movement of said shift lever from said forward position towards said reverse position but not to block movement of said shift lever from said reverse position towards said forward position, said reverse lock out latch also configured to be capable of being moved into said blocking position when said shift lever is in said reverse position;

providing at least one control linkage intermediate said cutting blade control and said reverse lock out latch, said control linkage configured in one operational mode to cause said reverse lock out latch to be moved to said blocking position when said cutting blade control is moved to said cutting position; and operating said lawn mower apparatus such that if a user attempts to shift said lawn mower from forward to reverse movement by use of said shift lever while said cutting blade is in said cutting mode and said control linkage is in said one operational mode, said cutting blade control must first be moved into said idle position to allow said reverse lock out latch to move to said cleared position, whereupon said shift lever may then be moved to said reverse position and then said cutting blade control may be moved back into said cutting position to cut in reverse.

7. The method claimed above in claim 6, wherein said shift lever goes through a neutral position when going from forward to reverse, and wherein said reverse lock out latch, when in said blocking position, precludes movement of said shift lever from said neutral position to reverse.

8. The method claimed above in claim 6, wherein said reverse lock out latch includes a pivotable latch configured to be placed in and out of the path of said shift lever depending on whether said cutting blade is engaged or disengaged, respectively.

9. The method claimed above in claim 6, wherein said reverse lock out latch includes a latch configured to be placed in and out of path of said shift lever depending on whether said cutting blade is engaged or disengaged, said latch being operated by a flexible cable.

10. The method claimed above in claim 6, wherein said reverse lock out latch includes a latch configured to be placed in and out of the path of said shift lever depending on whether said cutting blade is engaged or disengaged, said latch being operated by an electrical solenoid.

11. The method claimed above in claim 6, wherein said reverse lock out latch is shaped and spring loaded to allow said shift control lever to pass thereby from reverse to forward but not from forward to reverse, when said reverse lock out latch is in said blocking position.

12. A method of providing a lawn mower apparatus capable of cutting grass or other vegetation, said method comprising the steps of:

providing a cutting blade capable of cutting said grass or other vegetation;

providing a cutting blade control selectively movable between a cutting position and an idle, non-cutting, position, for causing said cutting blade to be either in a cutting mode or an idle mode, respectively;

providing a shift lever selectively moveable between a forward and a reverse position, for causing forward and rearward movement of said lawn mower apparatus, respectively;

providing a reverse lock out latch movable between a blocking position and a cleared position, said reverse lock out latch when in said cleared position configured to allow movement of said shift lever between said forward and reverse positions, said reverse lock out latch when in said blocking position configured to block movement of said shift lever from said forward position towards said reverse position but not to block movement of said shift lever from said reverse position towards said forward position, said reverse lock out latch also configured to be capable of being moved into said blocking position when said shift lever is in said reverse position;

providing at least one control linkage intermediate said cutting blade control and said reverse lock out latch, said control linkage configured in one operational mode to cause said reverse lock out latch to be moved to said blocking position when said cutting blade control is moved to said cutting position;

providing an override lever configured to selectively retain said reverse lock out latch from being moved to said blocking position when said cutting blade is in said cutting mode, said override lever, when activated, overriding said first operational mode operation of said reverse lock out latch to cause said lock out latch to operate in a second operational mode being an override mode; and operating said lawn mower apparatus such that if a user attempts to shift said lawn mower apparatus from forward to reverse movement by use of said shift lever while said cutting blade is in said cutting mode, said cutting blade control must first be moved into said idle position to allow said reverse lock out latch to move to said cleared position, unless said override lever is activated, whereupon activation of said override lever allows said shift lever to be moved to said reverse position while said cutting blade control remains in said cutting position.

13. In a method of providing a lawn cutting apparatus having forward and reverse apparatus direction control and capability provided at least in part by a lawn cutting apparatus direction control having forward and reverse modes, said lawn cutting apparatus also including a cutting blade control controlling alternate engagement and disengagement of a lawn cutting blade also being part of said lawn cutting apparatus, the improvement comprising the steps of:

providing a lock out device; and operating said lock out device in one operational mode so as to prevent said lawn cutting apparatus direction control from being placed into reverse unless said lawn cutting blade is first disengaged by use of said cutting blade control, said lock out device allowing said lawn cutting blade to be re-engaged by use of said cutting blade control, once said lawn cutting apparatus direction control is placed in reverse.

14. In a method of providing a lawn cutting apparatus having forward and reverse apparatus direction capability and control provided at least in part by a lawn cutting apparatus direction control having forward and reverse modes, and said lawn cutting apparatus also having a cutting blade control for controlling engagement and disengagement of a lawn cutting blade also being part of said lawn cutting apparatus, the improvement comprising:

providing a lock out device; and operating said lock out device in one operational mode so as to prevent said lawn cutting apparatus direction control from being placed into reverse unless said lawn cutting blade is first disengaged by use of said cutting blade control, said lock out device allowing said lawn cutting blade to be re-engaged by use of said cutting blade control once said lawn cutting apparatus direction control is placed in reverse, said lock out device also allowing said lawn cutting apparatus direction control to be moved out of reverse without disengaging said lawn cutting blade.

15. The method claimed above in claim 14, wherein said direction control includes a direction control lever and wherein said lock out device includes a latch configured to be placed in and out of the path of the direction control lever depending on whether said lawn cutting blade is engaged or disengaged, respectively.

16. In a method of providing a lawn cutting apparatus having forward and reverse apparatus direction control and capability provided at least in part by a lawn cutting apparatus direction control having forward and reverse modes, said lawn cutting apparatus also including a cutting blade control controlling alternate engagement and disengagement of a lawn cutting blade also being part of said lawn cutting apparatus, the improvement comprising:

providing a lock out device operably associated with said cutting blade control and configured in one operational mode for preventing said lawn cutting apparatus direction control from being placed into reverse unless said lawn cutting blade is first disengaged by use of said cutting blade control, said lock out device allowing said lawn cutting blade to be re-engaged by said cutting blade control once said lawn cutting apparatus direction control is placed in reverse; and providing a selectively operable override device for selectively overriding said first operational mode of said lock out device to cause said lock out device to operate in a second operational mode to selectively allow the selection of reverse without disengaging said cutting blade.

17. The improvement of claim 16, wherein said override device locks said lock out device in place until said lawn cutting blade is disengaged.

18. A method of providing a lawn mower apparatus capable of cutting grass or other vegetation, said method of providing a lawn mower apparatus comprising the steps of:

providing a cutting blade capable of cutting said grass or other vegetation; providing a cutting blade control selectively movable between a cutting position and an idle, non-cutting, position, for causing said cutting blade to be either in a cutting mode or an idle mode, respectively;

providing a direction control lever selectively moveable between a forward and a reverse position, for causing forward and rearward movement of said lawn mower apparatus, respectively;

providing a reverse lock out latch movable between a blocking position and a cleared position, said reverse lock out latch when in said cleared position configured to allow movement of said direction control lever between said forward and reverse positions, said reverse lock out latch when in said blocking position configured to block movement of said shift lever from said forward position towards said reverse position, said reverse lock out latch also configured to be moved into said blocking position when said direction control lever is in said reverse position;

providing at least one control linkage intermediate said cutting blade control and said reverse lock out latch, said control linkage configured in one operational mode to cause said reverse lock out latch to be moved to said blocking position when said cutting blade is in said cutting mode; and operating said lawn mower apparatus such that if a user attempts to shift said lawn mower apparatus from forward to reverse movement by use of said direction control lever while said cutting blade is in said cutting mode, said cutting blade control must first be moved into said idle position to allow said reverse lock out latch to move to said cleared position, whereupon said direction control lever may then be moved to said reverse position and then said cutting blade control may be moved back into said cutting position to cut in reverse.

19. The method of providing a lawn mower apparatus claimed above in claim 18, wherein said direction control lever goes through neutral when going from forward to reverse, and wherein said reverse lock out latch, when in said blocking position, precludes movement of said direction control lever from neutral to reverse.

20. The method of providing a lawn mower apparatus claimed above in claim 18, wherein said reverse lock out latch includes a pivotable latch configured to be placed in and out of the path of said direction control lever depending on whether said cutting blade is engaged or disengaged, respectively.

21. The method of providing a lawn mower apparatus claimed above in claim 18, wherein said reverse lock out latch includes a latch configured to be placed in and out of the path of said direction control lever depending on whether said cutting blade is engaged or disengaged, said latch being operated by a flexible cable.

22. The method of providing a lawn mower apparatus claimed above in claim 18, wherein said reverse lock out latch includes a latch configured to be placed in and out of the path of said direction control lever depending on whether said cutting blade is engaged or disengaged, said latch being operated by an electrical solenoid.

23. A method of providing a lawn mower capable of cutting grass or other vegetation, said method comprising the steps of:

providing a cutting blade capable of cutting said grass or other vegetation;

providing a cutting blade control selectively movable between a cutting position and an idle, noncutting, position, for causing said cutting blade to be either in a cutting mode or an idle mode, respectively;

providing a direction control lever selectively moveable between a forward and a reverse position, for causing forward and rearward movement of said lawn mower, respectively;

providing a reverse lock out latch movable between a blocking position and a cleared position, said reverse lock out latch when in said cleared position configured to allow movement of said direction control lever between said forward and reverse positions, said reverse lock out latch when in said blocking position configured to block movement of said direction control lever from said forward position towards said reverse position but not to block movement of said direction control lever from said reverse position towards said forward position, said reverse lock out latch also configured to be moved into said blocking position when said direction control lever is in said reverse position;

providing at least one control linkage intermediate said cutting blade control and said reverse lock out latch, said control linkage configured in one operational mode to cause said reverse lock out latch to be moved to said blocking position when said cutting blade is in said cutting mode; and operating said lawn mower apparatus such that if a user attempts to shift said lawn mower from forward to reverse movement by use of said direction control lever while said cutting blade is in said cutting mode, said cutting blade control must first be moved into said idle position to allow said reverse lock out latch to move to said cleared position, whereupon said direction control lever may then be moved to said reverse position and then said cutting blade control may be moved back into said cutting position to cut in reverse.

24. The method claimed above in claim 23, wherein said direction control lever goes through neutral when going from forward to reverse, and wherein said reverse lock out latch, when in said blocking position, precludes movement of said direction control lever from neutral to reverse.

25. The method claimed above in claim 23, wherein said reverse lock out latch includes a pivotable latch configured to be placed in and out of the path of said direction control lever depending on whether said cutting blade is engaged or disengaged, respectively.

26. The method claimed above in claim 23, wherein said reverse lock out latch latch configured to be placed in and out of path of said direction control lever depending on whether said cutting blade is engaged or disengaged, said latch being operated by a flexible cable.

27. The method claimed above in claim 23, wherein said reverse lock out latch includes a latch configured to be placed in and out of the path of said direction control lever depending on whether said cutting blade is engaged or disengaged, said latch being operated by an electrical solenoid.

28. The method claimed above in claim 23, wherein said reverse lock out latch is shaped and spring loaded to allow said direction control lever to pass thereby from reverse to forward but not from forward to reverse, when said reverse lock out latch is in said blocking position.

29. A method of providing a lawn mower apparatus capable of cutting grass or other vegetation, said method comprising the steps of:

provided a cutting blade capable of cutting said grass or other vegetation;

providing a cutting blade control selectively movable between a cutting position and an idle, noncutting, position, for causing said cutting blade to be either in a cutting mode or an idle mode, respectively;

providing a direction control lever selectively moveable between a forward and a reverse position, for causing forward and rearward movement of said lawn mower apparatus, respectively;

providing a reverse lock out latch movable between a blocking position and a cleared position, said reverse lock out latch when in said cleared position configured to allow movement of said direction control lever between said forward and reverse positions, said reverse lock out latch when in said blocking position configured to block movement of said direction control lever from said forward position towards said reverse position but not to block movement of said direction control lever from said reverse position towards said forward position, said reverse lock out latch also configured in one operational mode to be moved into said blocking position when said lever is in said reverse position;

providing at least one control linkage intermediate said cutting blade control and said reverse lock out latch, said control linkage configured in one operational mode to cause said reverse lock out latch to be moved to said blocking position when said cutting blade is in said cutting mode;

providing an override lever configured to selectively retain said reverse lock out latch from being moved to said blocking position when said cutting blade is in said cutting position, said override lever overriding the operation of said reverse lock out latch; and operating said lawn mower apparatus such that if a user attempts to shift said lawn mower apparatus from forward to reverse movement by use of said direction control lever while said cutting blade is in said cutting mode, said cutting blade control must first be moved into said idle position to allow said reverse lock out latch to move to said cleared position, unless said override lever is activated, whereupon said direction control lever may then be moved to said reverse position while said cutting blade control is in said cutting position.

30. In a method of operating a lawn cutting apparatus having forward and reverse apparatus direction control and capability provided at least in part by a lawn cutting apparatus direction control having forward and reverse modes, said lawn cutting apparatus also including a cutting blade control controlling alternate engagement and disengagement of a lawn cutting blade also being part of said lawn cutting apparatus, the improvement comprising:

operably linking said lock out device to said cutting blade control, such that said lock out device is capable of preventing said lawn cutting apparatus direction control from being placed into reverse unless said lawn cutting blade is first disengaged by use of said cutting blade control, and such that said lock out device allows said lawn cutting blade to be re-engaged by use of said cutting blade control, once said lawn cutting apparatus direction control is placed in reverse.

31. In a method of operating a lawn cutting apparatus having forward and reverse apparatus direction capability and control provided at least in part by a lawn cutting apparatus direction control having forward and reverse modes, and said lawn cutting apparatus also having a cutting blade control for controlling engagement and disengagement of a lawn cutting blade also being part of said lawn cutting apparatus, the improvement comprising:

operably linking said lock out device to said cutting blade control, such that said lock out device is capable of preventing said lawn cutting apparatus direction control from being placed into reverse unless said lawn cutting blade is first disengaged by use of said cutting blade control, and such that said lock out device allows said lawn cutting blade to be re-engaged by use of said cutting blade control once said lawn cutting apparatus direction control is placed in reverse, and such that said lock out device also allows said lawn cutting apparatus direction control to be moved out of reverse without disengaging said lawn cutting blade.

32. The method claimed above in claim 31, wherein said direction control includes a direction control lever and wherein said lock out device includes a latch configured to be placed in and out of the path of the direction control lever depending on whether said lawn cutting blade is engaged or disengaged, respectively.

33. In a method of operating a lawn cutting apparatus having forward and reverse apparatus direction control and capability provided at least in part by a lawn cutting apparatus direction control having forward and reverse modes, said lawn cutting apparatus also including a cutting blade control controlling alternate engagement and disengagement of a lawn cutting blade also being part of said lawn cutting apparatus, the improvement comprising:

providing a lock out device operably associated with said cutting blade control and configured in one operational mode for preventing said lawn cutting apparatus direction control from being placed into reverse unless said lawn cutting blade is first disengaged by use of said cutting blade control; and providing a selectively operable override device for selectively overriding the operation of said lock out device to selectively allow the selection of reverse without disengaging said cutting blade.

34. The improvement of claim 33, wherein said override device locks said lock out device in place until said lawn cutting blade is disengaged.

* * * * *

UNITED STATES PATENT AND TRADEMARK OFFICE
CERTIFICATE OF CORRECTION

PATENT NO. : 6,591,594 B2
DATED : July 15, 2003
INVENTOR(S) : Hancock et al.

It is certified that error appears in the above-identified patent and that said Letters Patent is hereby corrected as shown below:

<u>Column 15,</u>
Line 23, begin new sub-paragraph with "providing".

<u>Column 16,</u>
Line 64, after "latch", first occurrence, insert -- includes a --.

Signed and Sealed this

Twenty-fifth Day of November, 2003

JAMES E. ROGAN
*Director of the United States Patent and Trademark Office*